US012640868B2

(12) United States Patent
Manolakos et al.

(10) Patent No.: US 12,640,868 B2
(45) Date of Patent: May 26, 2026

(54) POSITIONING REFERENCE SIGNAL SELECTION FOR POWER SAVINGS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 18/006,755

(22) PCT Filed: Jul. 13, 2021

(86) PCT No.: PCT/US2021/041355
§ 371 (c)(1),
(2) Date: Jan. 25, 2023

(87) PCT Pub. No.: WO2022/055613
PCT Pub. Date: Mar. 17, 2022

(65) Prior Publication Data
US 2023/0336296 A1     Oct. 19, 2023

(30) Foreign Application Priority Data

Sep. 11, 2020     (IN) .............................. 202021039449

(51) Int. Cl.
*H04L 5/00*          (2006.01)
*H04B 17/318*      (2015.01)
(52) U.S. Cl.
CPC ......... *H04L 5/0048* (2013.01); *H04B 17/328* (2023.05)

(58) Field of Classification Search
CPC ........................... H04L 5/0048; H04B 17/318
See application file for complete search history.

(56) References Cited

U.S. PATENT DOCUMENTS

2010/0195566 A1     8/2010   Krishnamurthy et al.
2010/0323720 A1*   12/2010   Jen ........................ H04W 64/00
                                                                        455/456.1
(Continued)

FOREIGN PATENT DOCUMENTS

WO         2020061944 A1      4/2020
WO         2020089388 A1      5/2020
(Continued)

OTHER PUBLICATIONS

Ericsson, "Potential positioning enhancements", 3GPP TSG-RAN WG1 Meeting #102-e, e-meeting, Aug. 17-28, 2020, R1-2006916 (Year: 2020).*

(Continued)

*Primary Examiner* — Joseph A Bednash
(74) *Attorney, Agent, or Firm* — QUALCOMM Incorporated

(57)          ABSTRACT

Techniques are provided for herein for down selecting positioning reference signals with a user equipment (UE). An example method for measuring and reporting positioning reference signals includes receiving positioning reference signal measurement and accuracy requirements, measuring one or more positioning reference signals based on the measurement and accuracy requirements, and reporting one or more positioning reference signal measurement results based on the measurement and accuracy requirements.

30 Claims, 16 Drawing Sheets

(56) References Cited

U.S. PATENT DOCUMENTS

| | | | |
|---|---|---|---|
| 2018/0098300 A1 | 4/2018 | Venkatraman et al. | |
| 2021/0219268 A1* | 7/2021 | Li | H04B 17/318 |

FOREIGN PATENT DOCUMENTS

| | | |
|---|---|---|
| WO | 2020125310 A1 | 6/2020 |
| WO | 2020167055 A1 | 8/2020 |

OTHER PUBLICATIONS

Moderator (CATT), "FL Summary #5 for Potential Positioning Enhancements", #GPP TSG RAN WG1 Meeting #102-e., e-meeting, May 25-Jun. 5, 2020 [sic], R1-2007343 (Year: 2020).*

ZTE, Discussions on Potential NR positioning enhancements, 3GPP TSG RAN WG1 Meeting #102-e, e-meeting, Aug. 17-Aug. 28, 2020, R1-2005464 (Year: 2020).*

ZTE, "Channel state estimation based on prior channel information", 3GPP TSG RAN WG1 Meeting #102-e, e-Meeting, Aug. 17-Aug. 28, 2020, R1-2005465 (Year: 2020).*

Qualcomm Incorporated, "Evaluation of achievable Positioning Accuracy & Latency", 3GPP TSG RAN WG1 #102-3, e-meeting, Aug. 17-28, 2020, R1-2006809 (Year: 2020).*

CATT: "Summary #2 of UE and gNB Measurements for NR Positioning", 3GPP TSG RAN WG1 #98bis, 3GPP Draft, R1-1911625 (Revision of R1-1911531) FL Summary of NR POS Measurements Revision of R1-1911531, 3rd Generation Partnership Project (3GPP), Mobile Competence Centre, 650, Route Des Lucioles, F-06921 Sophia-Antipolis, vol. RAN WG1, No. Chongqing, China, Oct. 14-Oct. 18, 2019, pp. 1-33, Oct. 22, 2019 (Oct. 22, 2019), XP051798971, Sect. 4.1.

International Search Report and Written Opinion—PCT/US2021/041355—ISA/EPO—Nov. 5, 2021.

\* cited by examiner

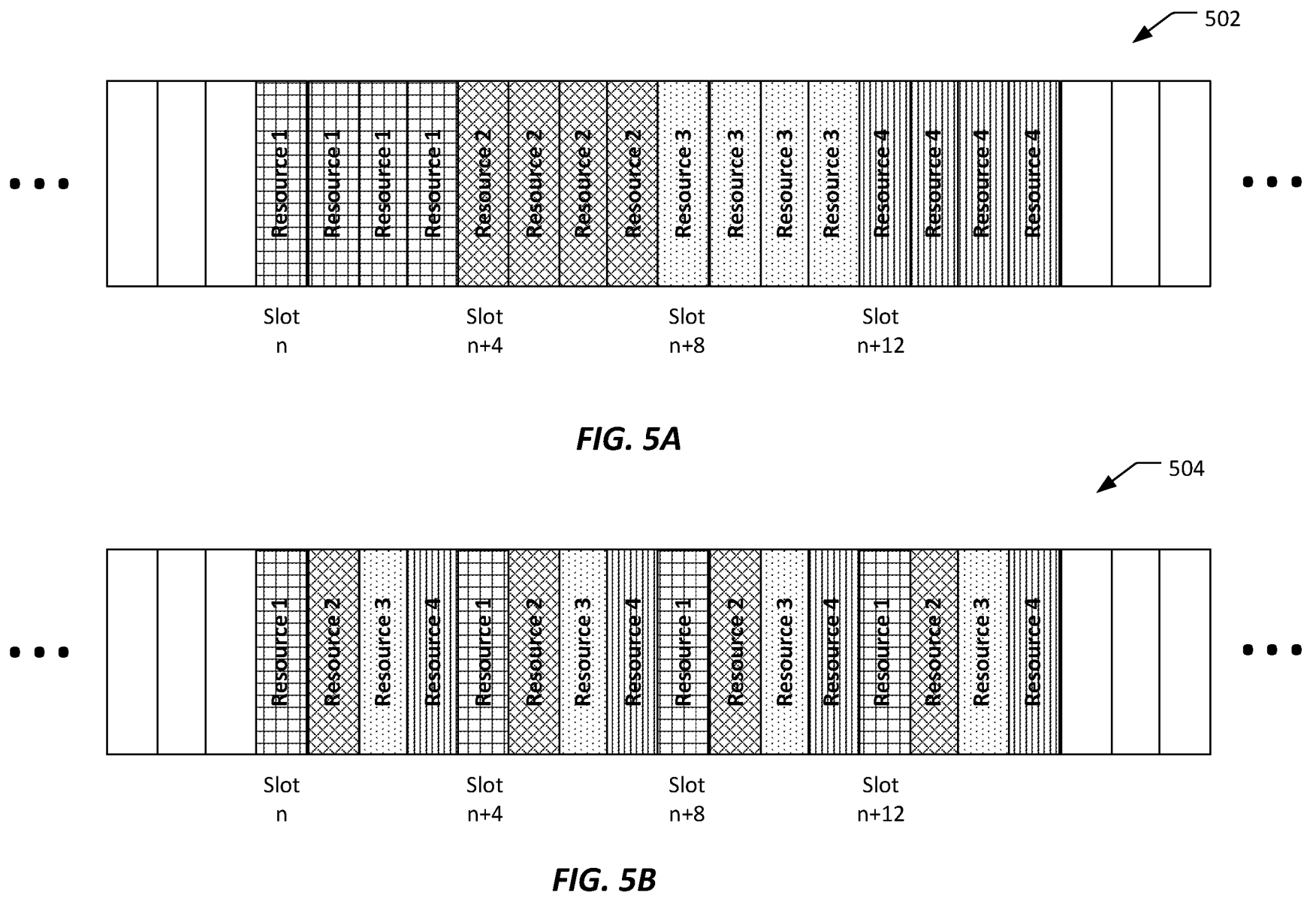

502

Resource 4
Resource 4
Resource 4
Resource 4

Slot
n+12

Resource 3
Resource 3
Resource 3
Resource 3

Slot
n+8

Resource 2
Resource 2
Resource 2
Resource 2

Slot
n+4

Resource 1
Resource 1
Resource 1
Resource 1

Slot
n

Resource 4
Resource 3
Resource 2
Resource 1

Slot
n+12

Resource 4
Resource 3
Resource 2
Resource 1

Slot
n+8

Resource 4
Resource 3
Resource 2
Resource 1

Slot
n+4

Resource 4
Resource 3
Resource 2
Resource 1

Slot
n

*FIG. 5B*

| Performance Metric | Cutoff Threshold | Number of TRPs |
|---|---|---|
| Metric_1 | X1 | Y1 |
| Metric_2 | X2 | Y2 |
| Metric_3 | X3 | Y3 |

1300

Receive positioning reference signal measurement and accuracy requirements — 1302

Measure one or more positioning reference signals based on the measurement and accuracy requirements — 1304

Report one or more positioning reference signal measurement results based on the measurement and accuracy requirements — 1306

1400

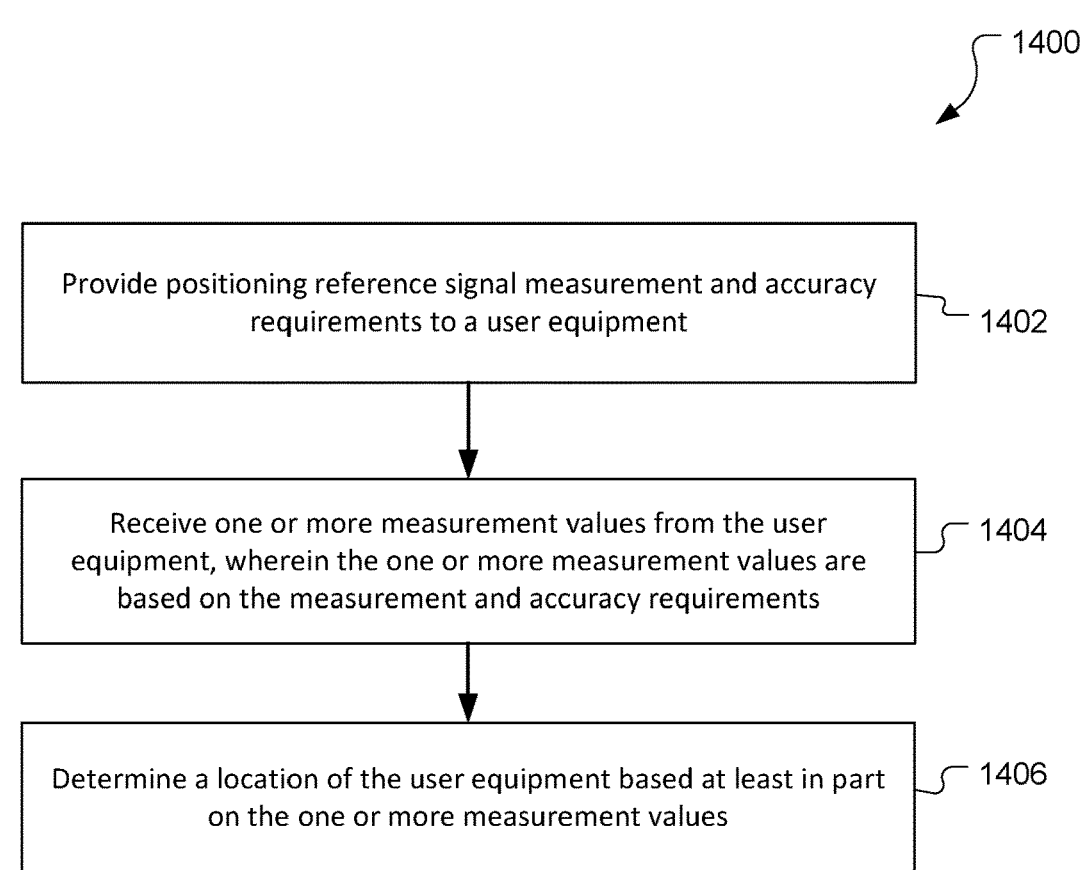

Provide positioning reference signal measurement and accuracy requirements to a user equipment — 1402

Receive one or more measurement values from the user equipment, wherein the one or more measurement values are based on the measurement and accuracy requirements — 1404

Determine a location of the user equipment based at least in part on the one or more measurement values — 1406

Obtain a plurality of positioning reference signals from one or more base stations — 1502

Determine measurement and accuracy requirements based on the plurality of positioning reference signals — 1504

Provide the measurement and accuracy requirements to a network entity — 1506

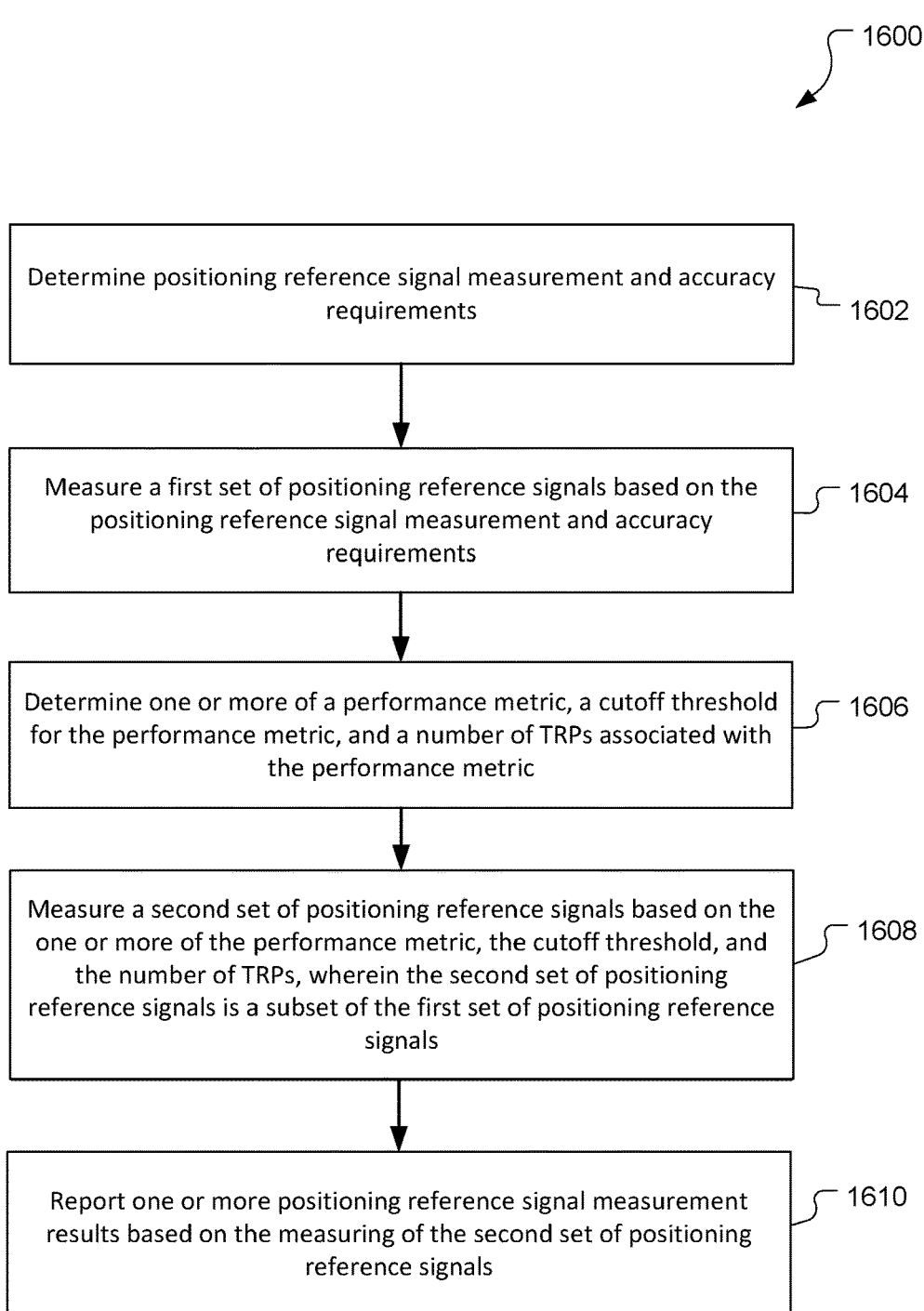

1600

Determine positioning reference signal measurement and accuracy requirements — 1602

Measure a first set of positioning reference signals based on the positioning reference signal measurement and accuracy requirements — 1604

Determine one or more of a performance metric, a cutoff threshold for the performance metric, and a number of TRPs associated with the performance metric — 1606

Measure a second set of positioning reference signals based on the one or more of the performance metric, the cutoff threshold, and the number of TRPs, wherein the second set of positioning reference signals is a subset of the first set of positioning reference signals — 1608

Report one or more positioning reference signal measurement results based on the measuring of the second set of positioning reference signals — 1610

FIG. 16

POSITIONING REFERENCE SIGNAL SELECTION FOR POWER SAVINGS

CROSS-REFERENCE TO RELATED APPLICATIONS

This application is the National Stage of International Application No. PCT/US2021/041355, filed Jul. 13, 2021, entitled "POSITIONING REFERENCE SIGNAL SELEC-TION FOR POWER SAVINGS," which claims the benefit of Indian Patent Application number 202021039449, filed Sep. 11, 2020, entitled "POSITIONING REFERENCE SIG-NAL SELECTION FOR POWER SAVINGS," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digi-tal wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless com-munication systems in use, including Cellular and Personal Communications Service (PCS) systems. Examples of known cellular systems include the cellular Analog Advanced Mobile Phone System (AMPS), and digital cel-lular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used inter-changeably herein. A location services (LCS) client may desire to know the location of the UE and may communicate with a location center in order to request the location of the UE. The location center and the UE may exchange mes-sages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal naviga-tion, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be con-figured to transmit reference signals to enable mobile device to perform positioning measurements. Improvements in position related signaling may improve the efficiency of mobile devices.

SUMMARY

An example method for measuring and reporting posi-tioning reference signals according to the disclosure includes determining positioning reference signal measure-ment and accuracy requirements, measuring a first set of positioning reference signals based on the positioning reference signal measurement and accuracy requirements, determining one or more of a performance metric, a cutoff threshold for the performance metric, and a number of TRPs associated with the performance metric, measuring a second set of positioning reference signals based on the one or more of the performance metric, the cutoff threshold, and the number of TRPs, wherein the second set of positioning reference signals is a subset of the first set of positioning reference signals, and reporting one or more positioning reference signal measurement results based on the measur-ing of the second set of positioning reference signals.

Implementations of such a method may include one or more of the following features. The cutoff threshold may be a normalized measurement value based on the performance metric. The positioning reference signal measurement and accuracy requirements may be are received from a TRP or a network server. The positioning reference signal measure-ment and accuracy requirements may be received via one or more of a positioning protocol message or a radio resource control message. The positioning reference signal measure-ment and accuracy requirements may be received from a user equipment via a sidelink. The positioning reference signal measurement and accuracy requirements may be included in one or more reports received on a physical sidelink shared channel (PSSCH). The method may include receiving sidelink configuration information from one or more TRPs, such that the positioning reference signal mea-surement and accuracy requirements are received from the user equipment via the sidelink based on the sidelink con-figuration information. The positioning reference signal measurement and accuracy requirements may be associated with a positioning frequency layer. The positioning refer-ence signal measurement and accuracy requirements may be associated with a positioning reference signal resource set. The positioning reference signal measurement and accuracy requirements may be associated with a positioning reference signal resource. The positioning reference signal measure-ment and accuracy requirements may be associated with a TRP. The performance metric may include one of a refer-ence signal received power (RSRP) value, a pathloss esti-mate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy. The positioning reference signal measurement and accuracy requirements may include a time duration or an expiration time. The time duration or the expiration time may be configured to instruct a user equipment to stop measuring one or more positioning reference signals in the first set of positioning reference signals for a period of time.

An example method for determining a location of a user equipment according to the disclosure includes providing positioning reference signal measurement and accuracy requirements to the user equipment, receiving one or more measurement values from the user equipment, wherein the one or more measurement values are based on the position-ing reference signal measurement and accuracy require-ments, and determining the location of the user equipment based at least in part on the one or more measurement values.

Implementations of such a method may include one or more of the following features. The positioning reference signal measurement and accuracy requirements may include a performance metric and at a cutoff threshold and a number of base stations associated with the performance metric. The performance metric may include one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy. The cutoff threshold may be a normalized measurement value based on the performance metric. The positioning reference signal measurement and accuracy requirements may be provided via one or more of a positioning protocol message or a radio resource control message. The positioning reference signal measurement and accuracy requirements may include a time duration or an expiration time. The time duration or the expiration time may be configured to instruct the user equipment to stop measuring one or more positioning reference signals for a period of time.

An example method for determining measurement and accuracy requirements according to the disclosure includes obtaining a plurality of positioning reference signals from one or more base stations, determining the measurement and accuracy requirements based on the plurality of positioning reference signals, and providing the measurement and accuracy requirements to a network entity.

Implementations of such a method may include one or more of the following features. The measurement and accuracy requirements may include a performance metric and at a cutoff threshold and a number of base stations associated with the performance metric. The performance metric may includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy. The cutoff threshold may be a normalized measurement value based on the performance metric. The method may include determining the measurement and accuracy requirements based on a Kalman filter and the plurality of positioning reference signals, and/or determining the measurement and accuracy requirements based on a machine learning algorithm and the plurality of positioning reference signals. Providing the measurement and accuracy requirements may include providing the measurement and accuracy requirements to a base station. Providing the measurement and accuracy requirements may include providing the measurement and accuracy requirements to a network server. Providing the measurement and accuracy requirements may include providing the measurement and accuracy requirements to a user equipment via a sidelink. The positioning reference signal measurement and accuracy requirements may be included in one or more reports provided on a physical sidelink shared channel (PSSCH). Sidelink configuration information may be received from one or more TRPs, such that the positioning reference signal measurement and accuracy requirements are provided to the user equipment via the sidelink based on the sidelink configuration information.

An example method for measuring and reporting positioning reference signals according to the disclosure includes receiving positioning reference signal measurement and accuracy requirements, measuring one or more positioning reference signals based on the positioning reference signal measurement and accuracy requirements, and reporting one or more positioning reference signal measurement results based on the measurement and accuracy requirements.

Implementations of such a method may include one or more of the following features. The positioning reference signal measurement and accuracy requirements may include a performance metric and at a cutoff threshold and a number of base stations associated with the performance metric. The cutoff threshold may be a normalized measurement value based on the performance metric. The positioning reference signal measurement and accuracy requirements may be received from a base station or a network server. The positioning reference signal measurement and accuracy requirements may be received via one or more of a positioning protocol message or a radio resource control message. The positioning reference signal measurement and accuracy requirements may be received from a user equipment via a sidelink. The positioning reference signal measurement and accuracy requirements may be associated with a positioning frequency layer. The positioning reference signal measurement and accuracy requirements may be associated with a positioning reference signal resource set. The positioning reference signal measurement and accuracy requirements may be associated with a positioning reference signal resource element. The positioning reference signal measurement and accuracy requirements may be associated with a base station. The positioning reference signal measurement and accuracy requirements may include a time duration or expiration time.

An example apparatus according to the disclosure includes a memory, at least one transceiver, at least one processor communicatively coupled to the memory and the at least one transceiver and configured to determine positioning reference signal measurement and accuracy requirements, measure a first set of positioning reference signals based on the positioning reference signal measurement and accuracy requirements, determine one or more of a performance metric, a cutoff threshold for the performance metric, and a number of TRPs associated with the performance metric, measure a second set of positioning reference signals based on the one or more of the performance metric, the cutoff threshold, and the number of TRPs, wherein the second set of positioning reference signals is a subset of the first set of positioning reference signals, and report one or more positioning reference signal measurement results based on the measuring of the second set of positioning reference signals.

An example apparatus according to the disclosure includes a memory, at least one transceiver, at least one processor communicatively coupled to the memory and the at least one transceiver and configured to provide positioning reference signal measurement and accuracy requirements to the user equipment, receive one or more measurement values from the user equipment, wherein the one or more measurement values are based on the positioning reference signal measurement and accuracy requirements, and determine the location of the user equipment based at least in part on the one or more measurement values.

An example apparatus according to the disclosure includes a memory, at least one transceiver, at least one processor communicatively coupled to the memory and the at least one transceiver and configured to obtain a plurality of positioning reference signals from one or more base stations, determine the measurement and accuracy requirements based on the plurality of positioning reference signals, and provide the measurement and accuracy requirements to a network entity.

An example apparatus for measuring and reporting positioning reference signals according to the disclosure includes means for determining positioning reference signal measurement and accuracy requirements, means for measuring a first set of positioning reference signals based on the positioning reference signal measurement and accuracy requirements, means for determining one or more of a performance metric, a cutoff threshold for the performance metric, and a number of TRPs associated with the performance metric, means for measuring a second set of positioning reference signals based on the one or more of the performance metric, the cutoff threshold, and the number of TRPs, wherein the second set of positioning reference signals is a subset of the first set of positioning reference signals, and means for reporting one or more positioning reference signal measurement results based on the measuring of the second set of positioning reference signals.

An example apparatus for determining a location of a user equipment according to the disclosure includes means for providing positioning reference signal measurement and accuracy requirements to the user equipment, means for receiving one or more measurement values from the user equipment, wherein the one or more measurement values are based on the positioning reference signal measurement and accuracy requirements, and means for determining the location of the user equipment based at least in part on the one or more measurement values.

An example apparatus for determining measurement and accuracy requirements according to the disclosure includes means for obtaining a plurality of positioning reference signals from one or more base stations, means for determining the measurement and accuracy requirements based on the plurality of positioning reference signals, and means for providing the measurement and accuracy requirements to a network entity.

An example method for measuring and reporting positioning reference signals according to the disclosure includes means for receiving positioning reference signal measurement and accuracy requirements, means for measuring one or more positioning reference signals based on the positioning reference signal measurement and accuracy requirements, and means for reporting one or more positioning reference signal measurement results based on the measurement and accuracy requirements.

An example non-transitory processor-readable storage medium comprising processor-readable instructions configured to cause one or more processors to measure and report positioning reference signals according to the disclosure includes code for determining positioning reference signal measurement and accuracy requirements, code for measuring a first set of positioning reference signals based on the positioning reference signal measurement and accuracy requirements, code for determining one or more of a performance metric, a cutoff threshold for the performance metric, and a number of TRPs associated with the performance metric, code for measuring a second set of positioning reference signals based on the one or more of the performance metric, the cutoff threshold, and the number of TRPs, wherein the second set of positioning reference signals is a subset of the first set of positioning reference signals, and code for reporting one or more positioning reference signal measurement results based on the measuring of the second set of positioning reference signals.

An example non-transitory processor-readable storage medium comprising processor-readable instructions configured to cause one or more processors to determine a location of a user equipment according to the disclosure includes code for providing positioning reference signal measurement and accuracy requirements to the user equipment, code for receiving one or more measurement values from the user equipment, wherein the one or more measurement values are based on the positioning reference signal measurement and accuracy requirements, and code for determining the location of the user equipment based at least in part on the one or more measurement values.

An example non-transitory processor-readable storage medium comprising processor-readable instructions configured to cause one or more processors to determine measurement and accuracy requirements according to the disclosure includes code for obtaining a plurality of positioning reference signals from one or more base stations, code for determining the measurement and accuracy requirements based on the plurality of positioning reference signals, and code for providing the measurement and accuracy requirements to a network entity.

An example non-transitory processor-readable storage medium comprising processor-readable instructions configured to cause one or more processors to measure and report positioning reference signals according to the disclosure includes code for receiving positioning reference signal measurement and accuracy requirements, code for measuring one or more positioning reference signals based on the positioning reference signal measurement and accuracy requirements, and code for reporting one or more positioning reference signal measurement results based on the measurement and accuracy requirements.

Items and/or techniques described herein may provide one or more of the following capabilities, as well as other capabilities not mentioned. User equipment may receive positioning reference signal measurement and accuracy requirements from a network entity. The user equipment may limit the number of positioning reference signal measurements obtained, decoded, and reported to the network based on the measurement and accuracy requirements. Positioning accuracy may be maintained and signaling overhead may be reduced. The reduction in signal measurements may conserve power in the user equipment and increase the efficiency of the user equipment's discontinuous reception mode. Other capabilities may be provided and not every implementation according to the disclosure must provide any, let alone all, of the capabilities discussed.

BRIEF DESCRIPTION OF THE DRAWINGS

FIGS. 5A and 5B illustrate example downlink positioning reference signal resource sets.

FIG. 14 is a process flow for an example method for determining a location of a user equipment.

FIG. 16 is a process flow for an example method for reporting positioning reference signal measurements.

DETAILED DESCRIPTION

Techniques are discussed herein for down selecting positioning reference signals with a user equipment (UE). A UE may be configured to receive multiple positioning reference signals (PRSs) from multiple stations during a positioning occasion. For example, a UE may be configured to perform positioning while in a Radio Resource Control (RRC) IDLE/inactive mode. In this scenario, a UE may need to decode a PRS ID provided in the assistance data and then report the PRS ID back to the network. To decode the PRS ID, the UE may need to enter an active state, such as a Discontinuous Reception Mode (DRX) On cycle, to perform the required measurement and reporting processes. The UE may then return to a DRX OFF state. A UE will consume more power with a larger number of PRS IDs to decode, or with an increase in time domain resources the UE needs to decode. Reducing the number PRSs to decode during a positioning session may save power and prolong the operation of a UE between charging. These techniques and configurations are examples, and other techniques and configurations may be used.

Figure 1:
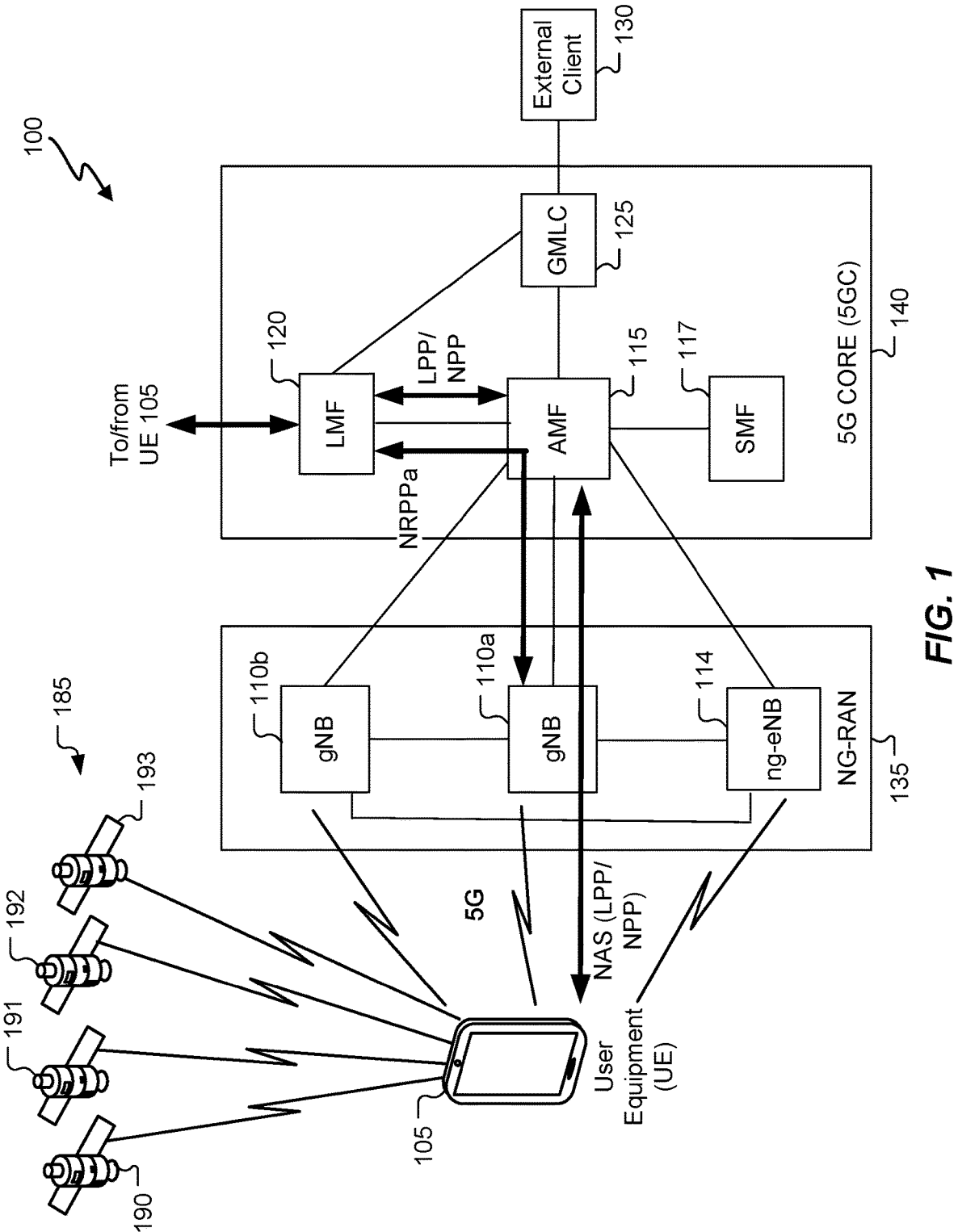
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs, such as the gNB 110a, gNB 110b, ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-U IRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
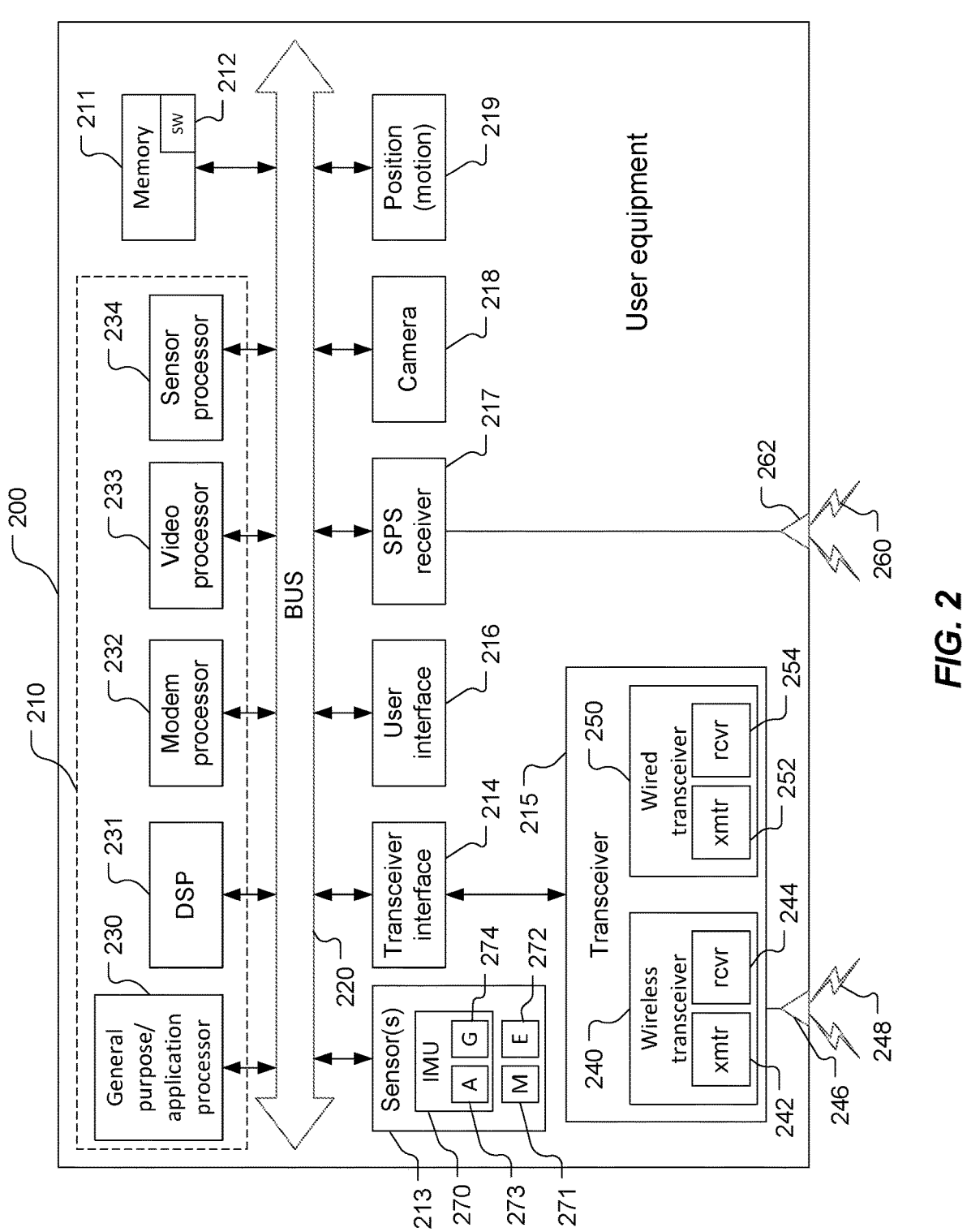
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
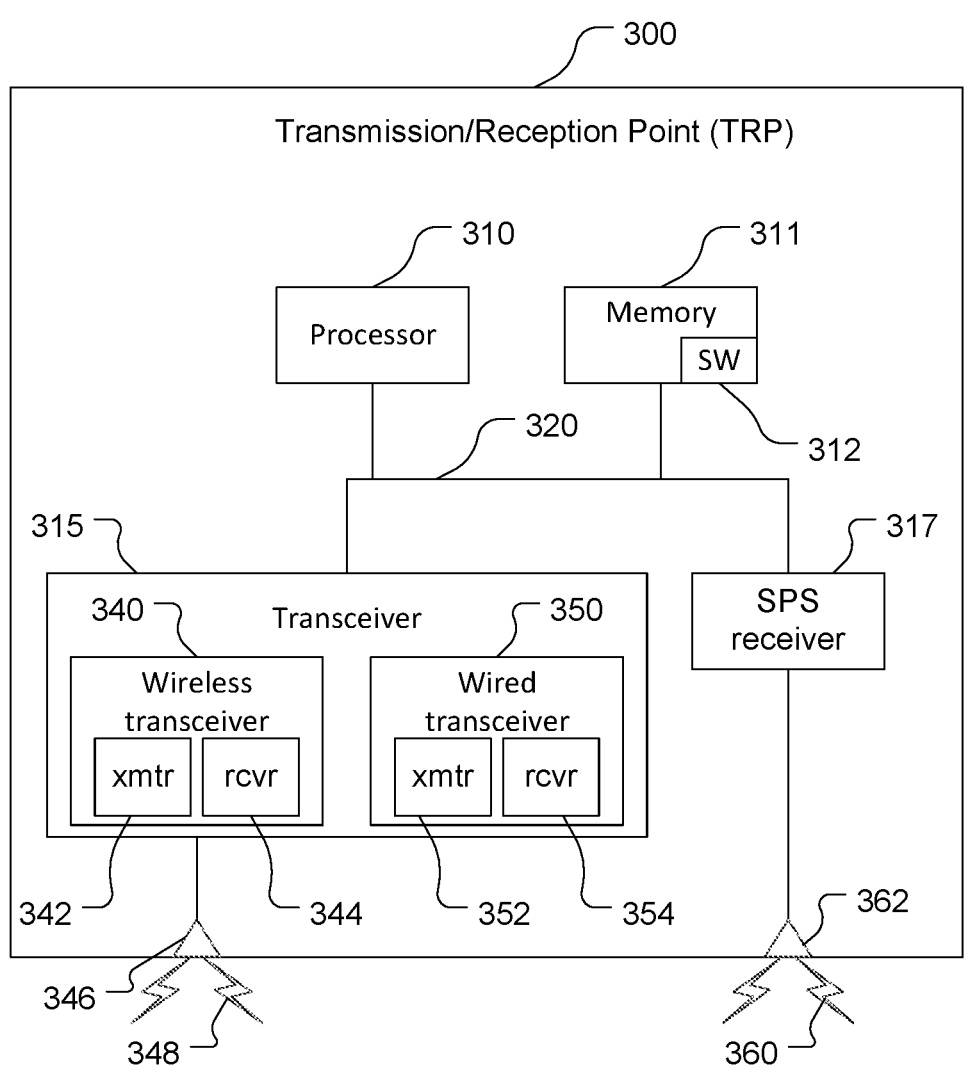
FIG. 3 is a block diagram of components of an example transmission/reception point shown in FIG. 1.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114, etc.) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
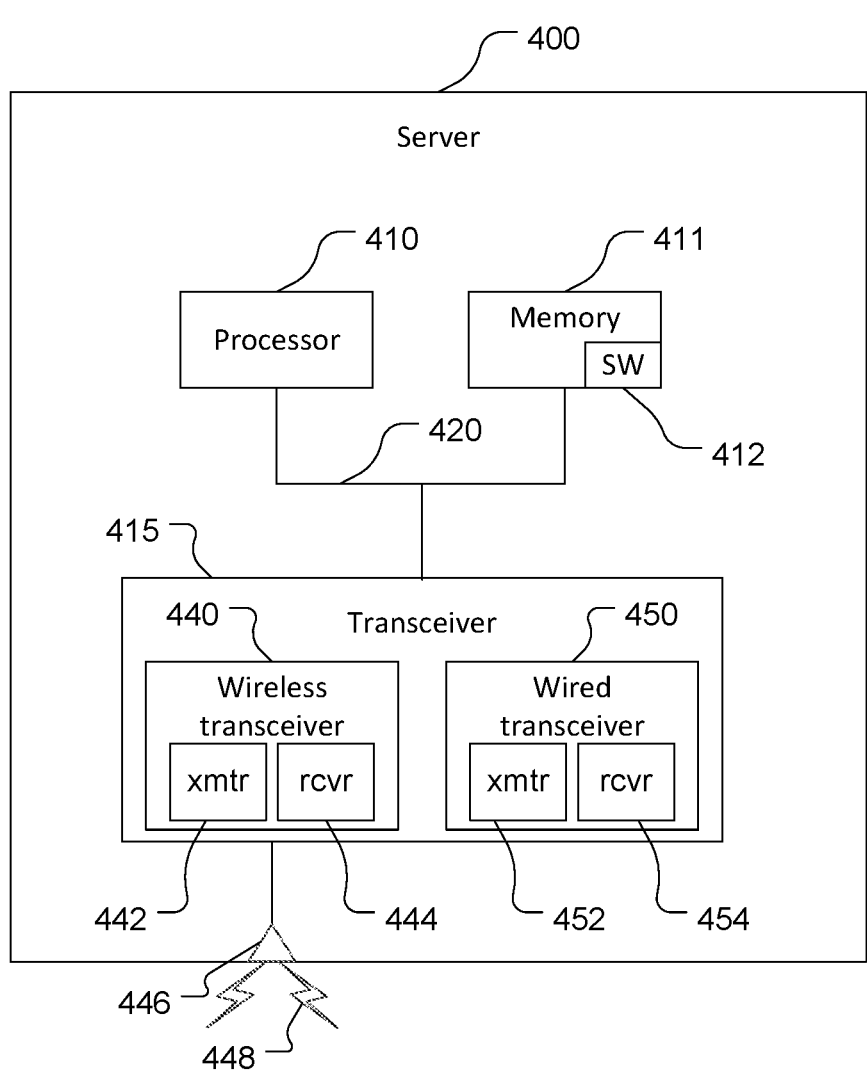
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
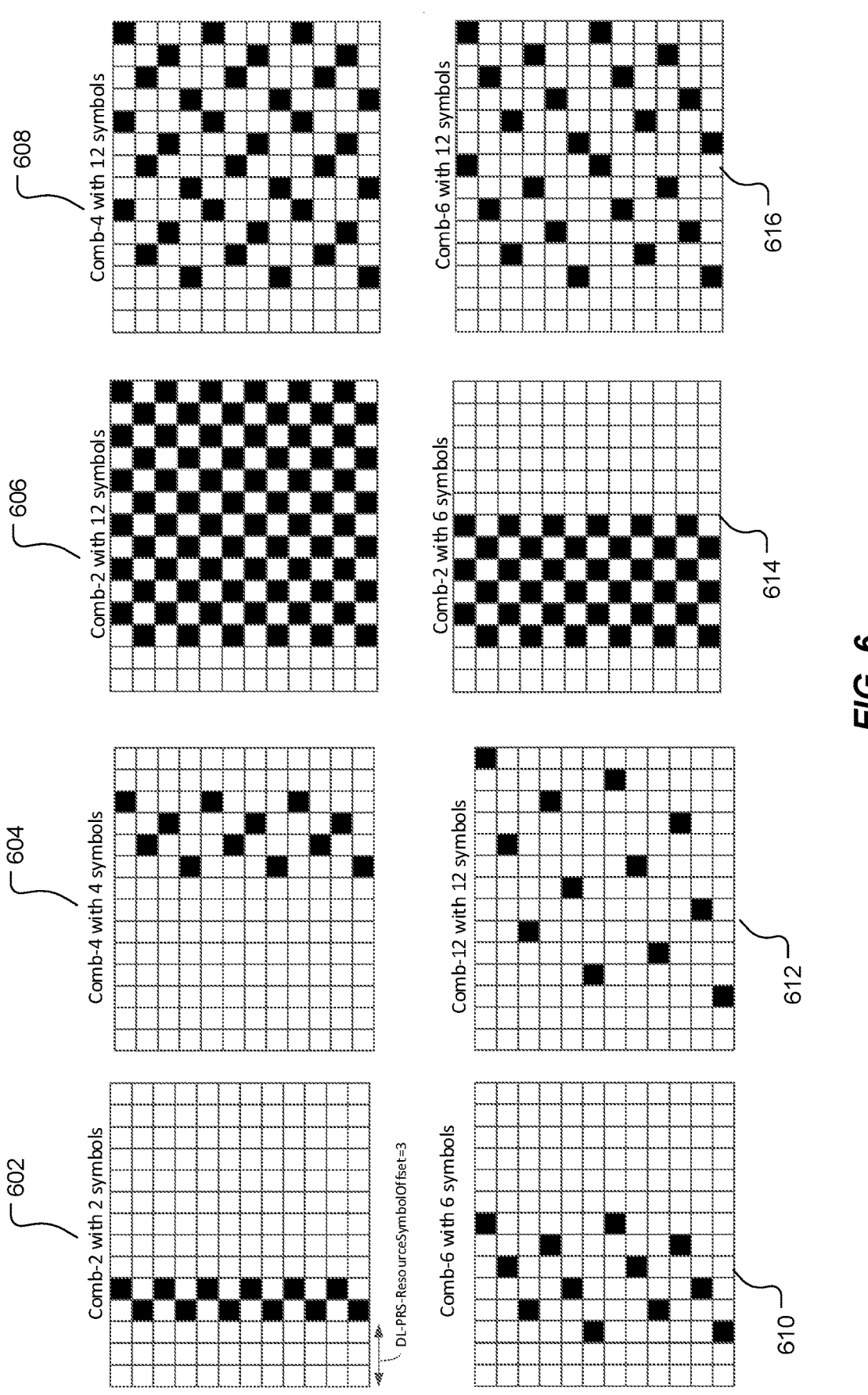
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
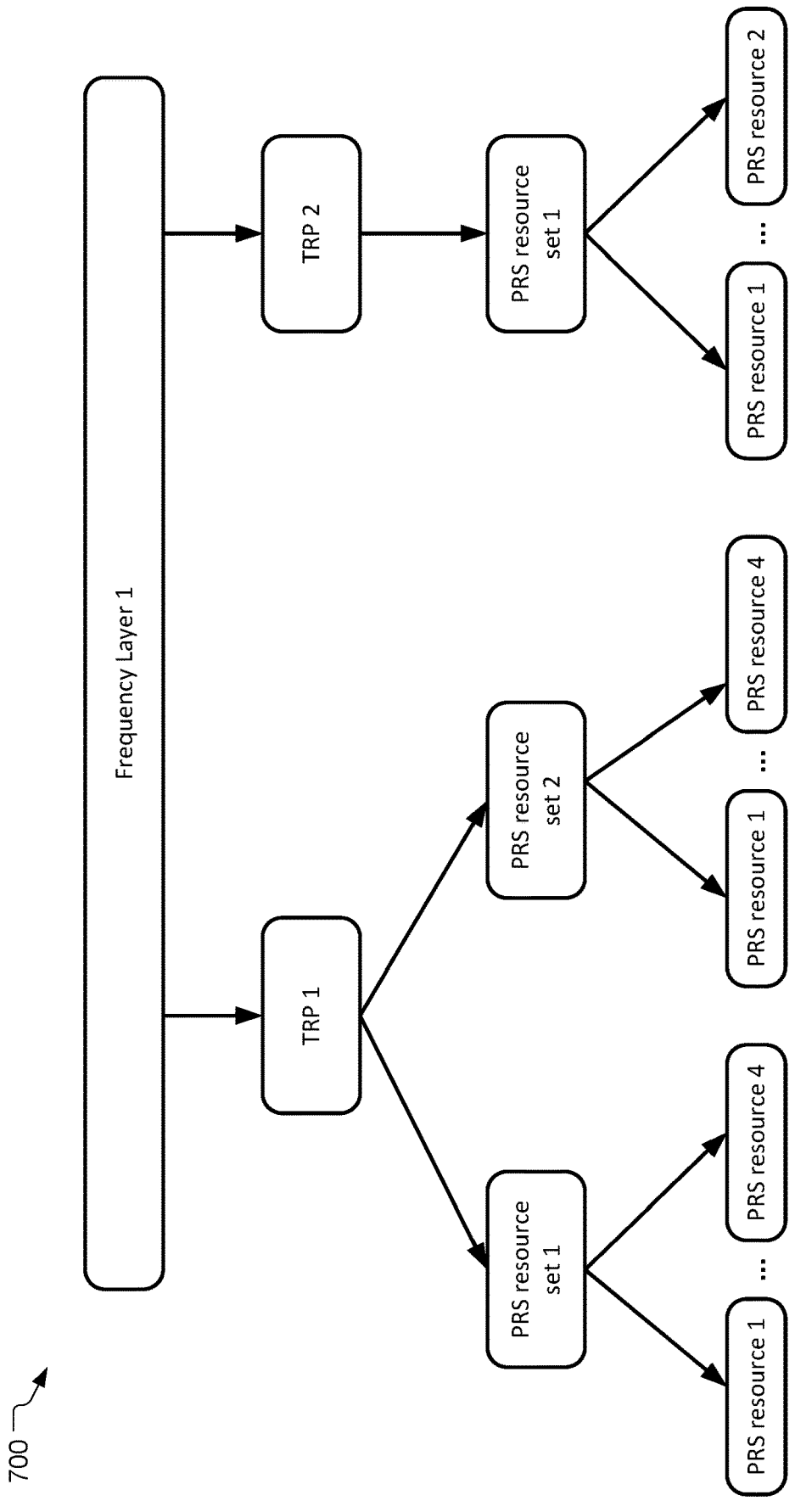
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots. As will be discussed, PRS measurement and accuracy requirements may be associated with a positioning frequency layer, a TRP, a PRS resource set, and/or each PRS resource.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 8:
FIG. 8 is an example of a data structure for positioning reference signal measurement and accuracy requirements.

Referring to FIG. 8, an example data structure 800 for positioning reference signal measurement and accuracy requirements is shown. In an embodiment, the data structure 800 may be information elements in a network object or other data objects such as flat files (e.g., JSON, XML, CSV, etc.) and may persist on the LMF 120, the TRP 300 and/or the UE 200. Other data formats may also be used as the data structure 800. In general, the data structure 800 provides the UE 200 metric based measurement and accuracy requirements to enable the UE 200 to reduce the number PRS measurements required to determine a position. The fields in the data structure 800 are examples and not limitations as other fields may be used to constrain the number of PRS measurements. In an embodiment, the data structure 800 may include one or more fields associated with a performance metric 802, a cutoff threshold 804, and a number of stations 806. The UE 200 is configured to use the cutoff threshold 804 and the number of stations 806 with an associated performance metric 802 to determine a number of PRS transmissions to measure and report. For example, the UE 200 may report a subset of received PRSs based at least in part on the performance metrics and the threshold values. For example, the performance metrics 802 may include PRS measurement values such as RSRP, RSRQ, SNR, TOA accuracy, RSTD accuracy, RX and TX accuracy. In an example, the measurement and accuracy requirements may be based on a period of time (e.g., an expiration timer) and the UE 200 may apply the constraints during the period of time.

Figure 9:
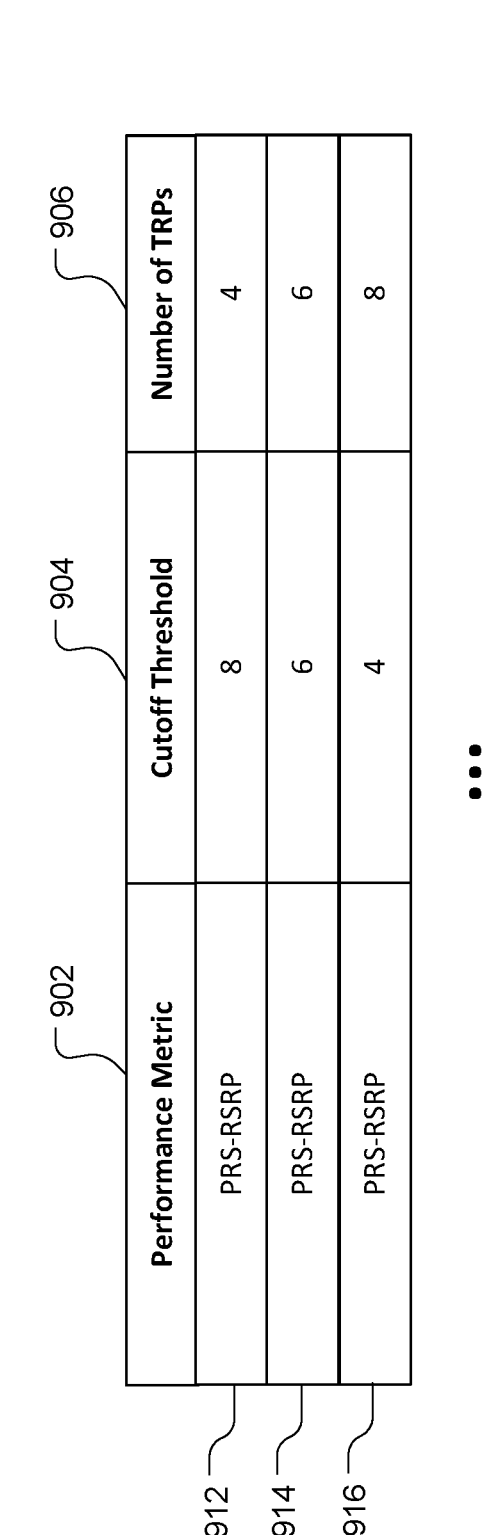
FIG. 9 is an example positioning reference signal measurement and accuracy requirements including a cutoff threshold and a number of base stations associated with a metric value.

Referring to FIG. 9, with further reference to FIG. 8, example positioning reference signal measurement and accuracy requirements 900 including a cutoff threshold and a number or base stations associated with a metric value are shown. The PRS measurement and accuracy requirement 900 includes a performance metric 902, cutoff threshold values 904, and number of base station values 906. The PRS measurement and accuracy requirement 900 includes three example requirements including a first requirement 912, a second requirement 914 and a third requirement 916. The number of requirements, the performance metric, threshold values, and number of base station values are examples, and not limitations as other metrics, values and requirements may be used. The RSRP performance metric is used as an example to demonstrate the impact of the cutoff threshold values 904 and the number of base station values 906. One or more measurement values such as RSRP, RSRQ, SNR, TOA accuracy, RSTD accuracy, RX and TX accuracy may also be used individually and/or in combination with other measurement values. In an example, the cutoff threshold values 904 may be normalized values (e.g., values 0 through 10) based on predetermined measurement ranges. For example, the metrics and corresponding raw measurement ranges may include values such as: RSRP: dBm [−50, −100], RSRQ: dBm [−50, −100], SNR: dB [−15, 0], TOA accuracy: nsec or meters, it may also be proportional to the $2''^*Tc=2''^*0.5$ nsec, n=0, 1, 2, 3, 4 (where Tc is the sampling rate), RSTD accuracy: nsec or meters, it may also be proportional to the $2''^*Tc=2140.5$ nsec, n=0, 1, 2, 3, 4, and RX-TX accuracy: nsec or meters, it may also be proportional to the $2''^*Tc=2140.5$ nsec, n=0, 1, 2, 3, 4.

The requirements 912, 914, 916 of the PRS measurement and accuracy requirements 900 are based on the measured RSRP on a normalized scale from 0 to 10 and the number of base stations the PRSs are received on. For example, the first requirement 912 will configured the UE 200 to report a minimum of 4 TRPs with a minimum RSRP threshold greater than 8, the second requirement 914 will configured the UE 200 to report a minimum of 6 TRPs with a minimum RSRP threshold greater than 6, and the third requirement 916 will configured the UE 200 to report a minimum of 8 TRPs with a minimum RSRP threshold greater than 4. The requirements 912, 914, 916 and associated threshold and TRP values are examples. Other metrics and values may be used to obtain adequate positioning accuracy (e.g., based on regulatory or commercial requirements) and reduce the number of PRS measurements obtained and reported by the UE 200. The PRS measurement and accuracy requirements 900, and associated timers (if any), may be configured for each PRS resource, each PRS resource set, each positioning frequency layer, and each TRP.

In operation, the UE 200 may receive one or more PRS measurement accuracy requirements 900 from a network resource such as the NG-RAN 135 (e.g., gNB 110a, ng-eNB 114) and/or a network server such as the LMF 120. A gNB may utilize NAS transport layer messaging (e.g., LPP/NPP), RRC messaging, a Uu interface, or other communication protocols to provide the PRS measurement and accuracy requirements 900 to a UE. In an example, a first UE may be configure to provide the PRS measurement and accuracy requirements to another UE via a D2D sidelink (e.g., a Physical Sidelink Shared Channel (PSSCH)). In a V2X application, a Roadside Unit (RSU) and a UE may exchange PRS measurement and accuracy requirement information via the PC5 interface.

In an embodiment, the UE 200 may be configured to determine the values of the PRS measurement and accuracy requirements. For example, the UE 200 may be configured to utilize local position accuracy models with defined thresholds for metrics such as PRS-RSRP, PRS-Pathloss, PRS-RSRQ, PRS-SNR, PRS-TOA accuracy, PRS-RSTD accuracy, and PRS-RX-TX accuracy. The local position accuracy models may be based on Kalman filtering, machine learning algorithms, deep learning, one or more neural networks, or other statistical processes to correlate a position accuracy with one or more of the metrics. The local position accuracy models may be provided to a network entity such as the TRP 300, the LMF 120, or another network server 400. In an example, a network entity may be configured to receive location and PRS measurement and accuracy requirement information from the UE 200 and provide it to other UEs in the network. In an embodiment, the LMF 120 may be configured to receive PRS measurement and accuracy requirement information from a plurality of UEs in the network in a crowdsourcing application. The LMF 120 may be configured to aggregate and smooth the crowdsourced PRS measurements and accuracy requirement information for dissemination to other UE's in the network. The UE 200 may provide locally generated PRS measurement and accuracy requirements to other UEs via sidelink protocols. In a V2X environment, the UE 200 may provide locally generated PRS measurement and accuracy requirements to a RSU via a PC5 interface, and the RSU may subsequently provide the PRS measurement and accuracy requirements to another UE and/or the communication system 100.

Figure 10:
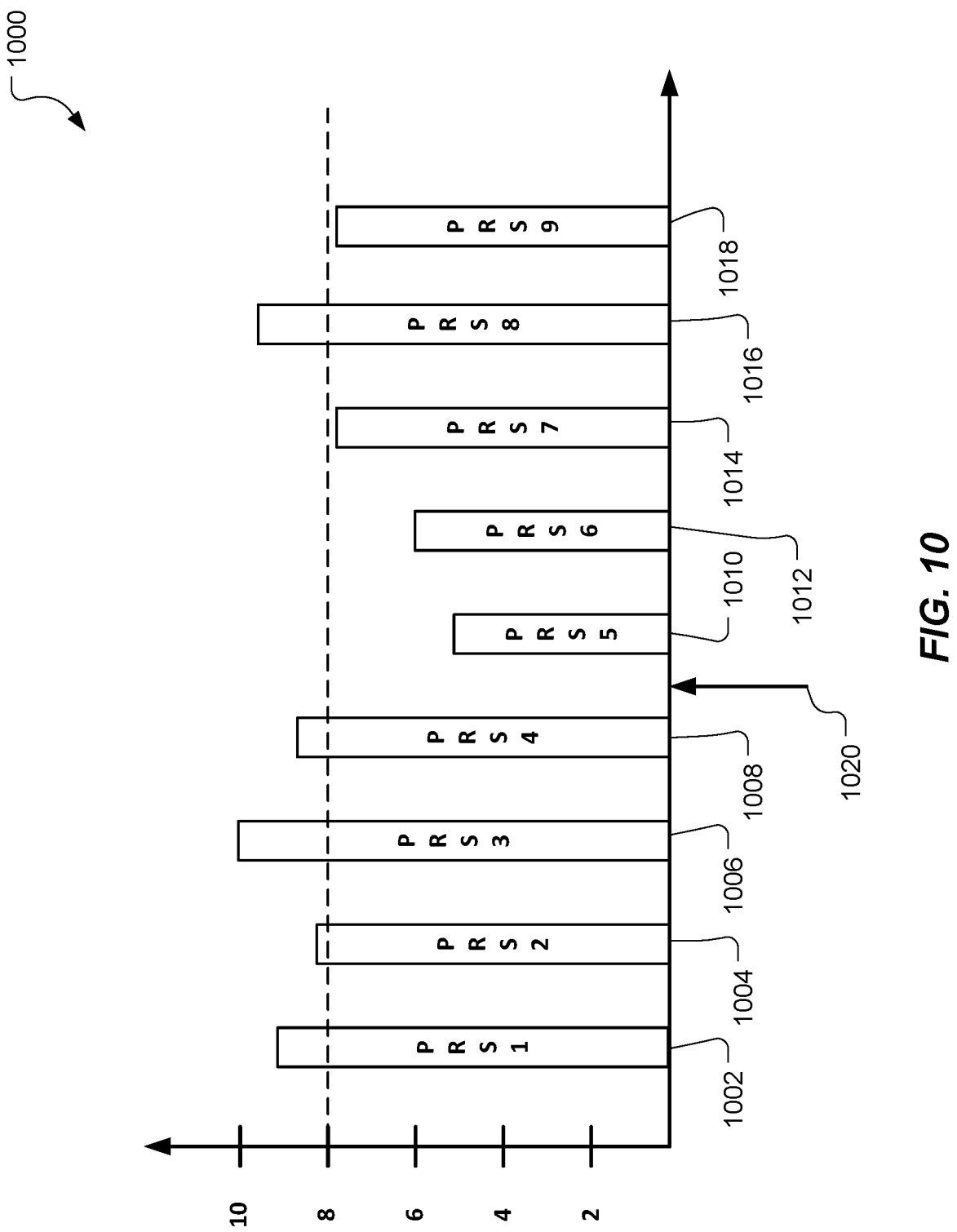
FIG. 10 is a first example graph of positioning reference signals received by a user equipment.

Referring to FIG. 10, with further reference to FIG. 9, a first example graph 1000 of positioning reference signals received by a UE is shown. The first example graph 1000 illustrates the first requirement 912 in FIG. 9. The UE 200 may potentially receive PRS signals from nine different TRPs, the nine PRSs may include a first PRS 1002, a second PRS 1004, a third PRS 1006, a fourth PRS 1008, a fifth PRS 1010, a sixth PRS 1012, a seventh PRS 1014, an eighth PRS 1016, and a ninth PRS 1018. The UE 200 may execute the first requirement 912 to report only 4 TRPs with a minimum RSRP threshold of 8. Thus, the UE 200 will decode only the first, second, third and fourth PRS 1002, 1004, 1006, 1008 and report only 4 PRS IDs to a serving station (e.g., gNB 110a) and/or the LMF 120. The UE 200 may stop measuring at time point 1020 since the 4 TRP requirement is met after the fourth PRS 1008 is received. Power savings may be realized because the UE 200 does not decode the fifth PRS 1010, the sixth PRS 1012, the seventh PRS 1014, the eighth PRS 1016 and the ninth PRS 1018.

Figure 11:
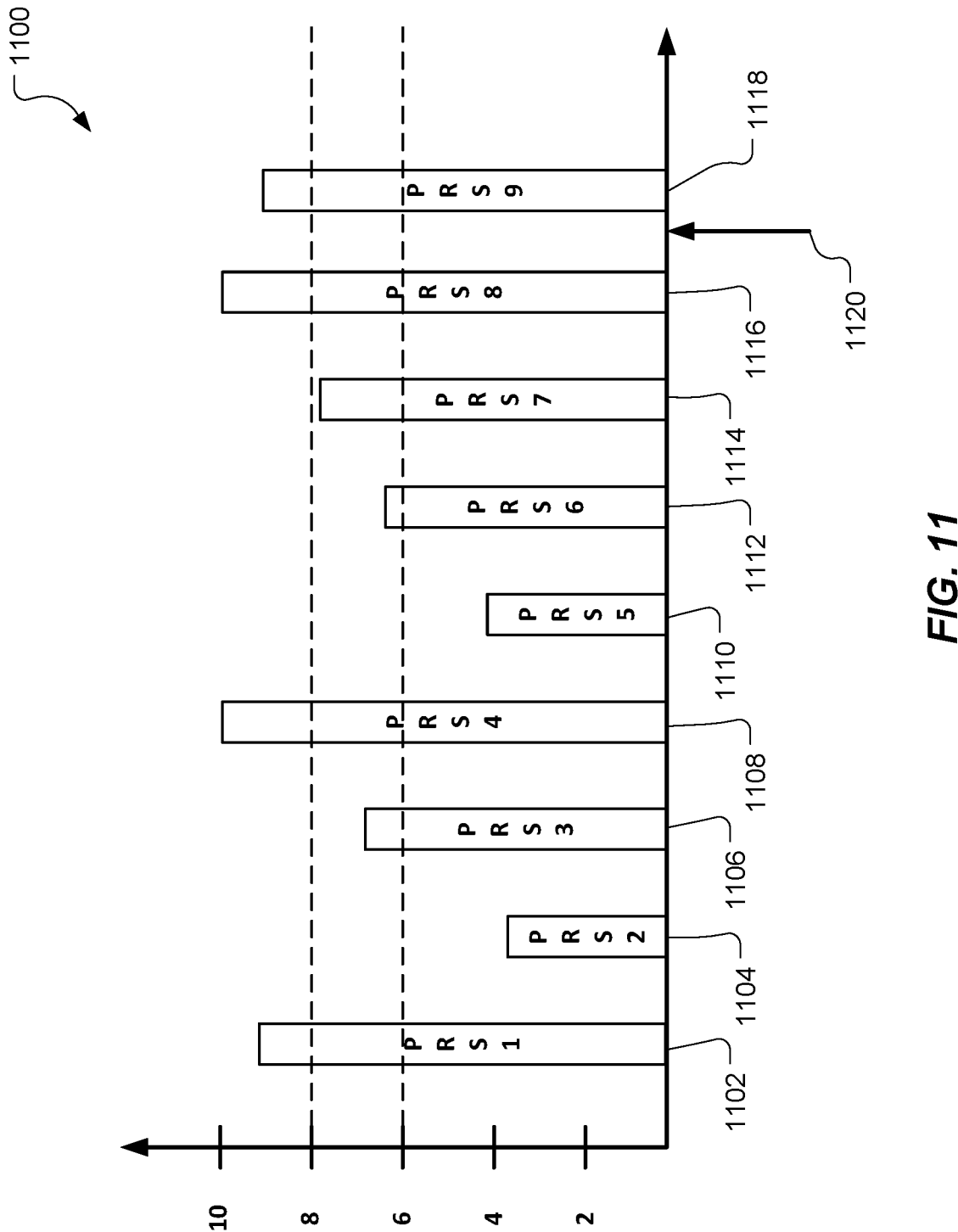
FIG. 11 is a second example graph of positioning reference signals received by a user equipment.

Referring to FIG. 11, with further reference to FIG. 9, a second example graph 1100 of positioning reference signals received by a UE is shown. The second example graph 1100 illustrates the second requirement 914 in FIG. 9. The UE 200 may potentially receive PRS signals from nine different TRPs, the nine PRSs may include a first PRS 1102, a second PRS 1104, a third PRS 1106, a fourth PRS 1108, a fifth PRS 1110, a sixth PRS 1112, a seventh PRS 1114, an eighth PRS 1116, and a ninth PRS 1118. The UE 200 may execute the second requirement 914 to report only 6 TRPs with a minimum RSRP threshold of 6. Thus, the UE 200 will decode only the first PRS 1102, the second PRS 1104, the third PRS 1106, the fourth PRS 1108, the fifth PRS 1110, the sixth PRS 1112, the seventh PRS 1114, and the eighth PRS 1116, and report the 6 PRS IDs to a serving station (e.g., gNB 110a) and/or the LMF 120. The UE 200 may stop measuring at time point 1120 since the 6 TRP requirement is met after the eighth PRS 1116 is received. Power savings may be realized because the UE 200 does not decode the ninth PRS 1118.

Figure 12:
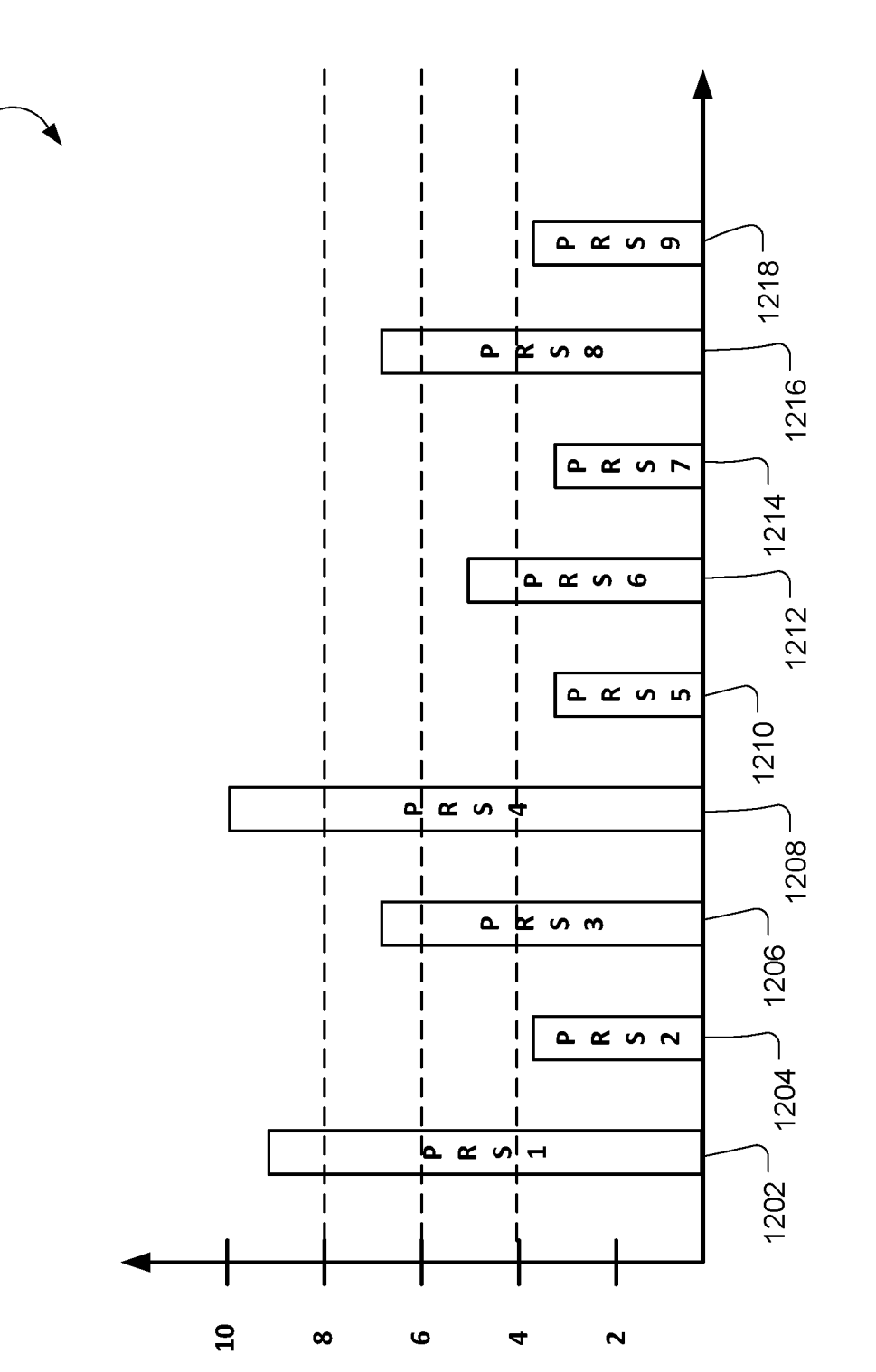
FIG. 12 is a third example graph of positioning reference signals received by a user equipment.

Referring to FIG. 12, with further reference to FIG. 9, a third example graph 1200 of positioning reference signals received by a UE is shown. The third example graph 1200 illustrates a case where none of the requirements 912, 914, 916 in FIG. 9 are met. The UE 200 may potentially receive PRS signals from nine different TRPs, the nine PRSs may include a first PRS 1202, a second PRS 1204, a third PRS 1206, a fourth PRS 1208, a fifth PRS 1210, a sixth PRS 1212, a seventh PRS 1214, an eighth PRS 1216, and a ninth PRS 1218. The UE 200 may attempt to execute the first requirement 912, the second requirement 914, and the third requirement 916. In this example, the UE 200 decodes two PRS IDs with a threshold above 8 (i.e., the first PRS 1202, the fourth PRS 1208), 4 PRS IDs with a threshold above 6 (i.e., the first PRS 1202, the third PRS 1206, the fourth PRS 1208, the eighth PRS 1216), and 5 PRS IDs above a threshold of 4 (i.e., the first PRS 1202, the third PRS 1206, the fourth PRS 1208, the sixth PRS 1212, the eighth PRS 1216). In this example, since the UE 200 measures and reports all of the PRSs, a power savings may not be realized as compared to the first and second example graphs 1000, 1100.

Figure 13:
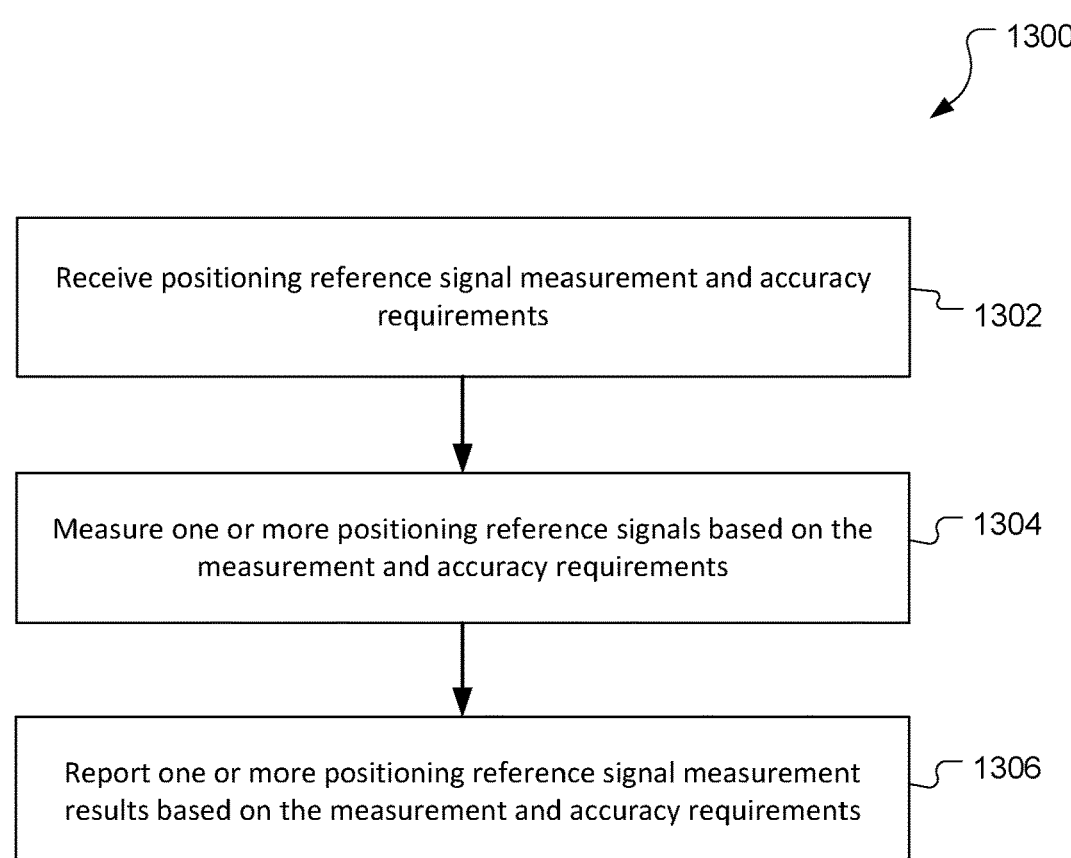
FIG. 13 is a process flow for an example method for measuring and reporting positioning reference signals based on measurement and accuracy requirements.

Referring to FIG. 13, with further reference to FIGS. 1-12, a method 1300 for measuring and reporting positioning reference signals based on measurement and accuracy requirements includes the stages shown. The method 1300 is, however, an example only and not limiting. The method 1300 may be altered, e.g., by having stages added, removed, rearranged, combined, performed concurrently, and/or having single stages split into multiple stages. For example, reporting a first PRS measurement at stage 1306 may occur before measuring a second PRS at stage 1304.

At stage 1302, the method includes receiving positioning reference signal measurement and accuracy requirements. The UE 200, including the general-purpose processor 230 and the transceiver 215, is a means for receiving the PRS measurement and accuracy requirements. In an embodiment, the PRS measurement and accuracy requirements may be a data structure 800 including one or more performance metrics 802 and corresponding cutoff thresholds 804 and number stations 806. The metrics and values may be associated with a positioning frequency layer, a base station, a PRS resource set, and/or a PRS resource. The PRS measurement and accuracy requirements may include a timer value indicating a time period and/or duration in which the requirements are to be applied. That is, the UE 200 may be configured to revert to a default operation upon the expiration of the timer value. In an example, a network entity such as the LMF 120, a gNB 110a, or a UE 105 may provide the PRS measurement and accuracy requirements to the UE 200. The gNB 110a may be configured to transmit the metrics and values in LPP/NPP or RRC messaging. In an example, the PRS measurement and accuracy requirements may be included in one or more System Information Blocks (SIBs). In an embodiment, lower level messaging such as via Downlink Control Information (DCI), or Medium Access Control (MAC) Control Elements (CE) may be used. The UE 105 may be configured to provide the PRS measurement and accuracy requirements to the UE 200 via a sidelink interface.

At stage 1304, the method includes measuring one or more positioning reference signals based on the measurement and accuracy requirements. The UE 200, including the general-purpose processor 230 and the transceiver 215, is a means for measuring the PRS. The UE 200 may be configured to determine measurement values based on PRS signals transmitted from a plurality of base stations. The PRS resources depicted in FIGS. 5A, 5B and 6 are examples of the PRS signals. The UE 200 may be configured to obtain one or more measurement metrics such as RSRP, RSRQ, SNR, TOA accuracy, RSTD accuracy, RX and TX accuracy for each of the PRS signals. The PRS measurement and accuracy requirements may indicate one or more metrics and associated cutoff threshold values. The cutoff threshold values may be based on raw measurement values, normalized values, or relative values to indicate the results of the measurement. The UE 200 may obtain a measurement value based on the metric indicated in the PRS measurement and accuracy and decode the PRS ID of the measured beam. In an example, the UE 200 may apply the PRS measurement and accuracy requirements as each PRS is received. For example, referring to FIGS. 9 and 10, the UE 200 may be configured to limit the number of PRS signals based on the first requirement 912 to include 4 TRPs with RSRP signals above a measurement value of 8. The UE 200 may measure, decode and report the first PRS 1002, the second PRS 1004, the third PRS 1006, and the fourth PRS 1008 and then stop measuring and reporting when the first requirement 912 (or any other requirement) is satisfied. The UE 200 may continue measuring and reporting only the first PRS 1002, the second PRS 1004, the third PRS 1006, and the fourth PRS 1008 until the measurement requirement is not satisfied (i.e., the RSRP of one PRS drops below 8). The UE 200 may then receive additional PRS measurements until another requirement is met. In an example, the UE 200 may initially measure and decode each received PRS and apply the PRS measurement and accuracy requirements on subsequent PRS measurement occasions. For example, the UE 200 could initially measure and decode all nine PRSs in FIG. 10 and only report the first PRS 1002, the second PRS 1004, the third PRS 1006, and the fourth PRS 1008. On subsequent positioning occasions, the UE 200 could measure and report only the first PRS 1002, the second PRS 1004, the third PRS 1006, and the fourth PRS 1008 until the first requirement 912 is not satisfied (i.e., the RSRP value of one of the PRS drops below 8). The UE 200 could then initiate a full scan, or a partial scan until a PRS measurement and accuracy requirement is satisfied.

At stage 1306, the method includes reporting one or more positioning reference signal measurement results based on the measurement and accuracy requirements. The UE 200, including the general-purpose processor 230 and the transceiver 215, is a means for reporting the one or more PRS measurements. One or more measurement values (e.g., RSRP, RSRQ, SNR, TOA accuracy, RSTD accuracy, RX and TX accuracy) associated with the PRS (or multiple PRS for RSTD) may be reported by the UE 200 to the network (e.g., gNB 110a, LMF 120). The UE 200 may utilize LPP/NPP, RRC or other messaging to report the PRS measurement results. In an example, the UE 200 may obtain PRS measurements from multiple base stations and limit the reporting to only the PRS ID which satisfy a PRS measurement and accuracy requirement. For example, referring to FIG. 10, the UE 200 may initially obtain PRS measurements on nine PRS transmissions and only report measurements for the first PRS 1002, the second PRS 1004, the third PRS 1006, and the fourth PRS 1008. In other examples, the UE 200 only measures PRS based on the PRS measurement and accuracy requirements and reports each of the measurements. A decrease in measurement time, decoding or reporting may decrease the power consumed by the UE 200 for PRS. Further, for a UE in a DRX mode, the decreases may also reduce the amount of time the UE must be in the DRX ON state which may also reduce power consumption.

Referring to FIG. 14, with further reference to FIGS. 1-12, a method 1400 for determining a location of a user equipment includes the stages shown. The method 1400 is, however, an example only and not limiting. The method 1400 may be altered, e.g., by having stages added, removed, rearranged, combined, performed concurrently, and/or having single stages split into multiple stages.

At stage 1402, the method includes providing positioning reference signal measurement and accuracy requirements to a user equipment. The TRP 300 and the LMF 120 are example means for providing the PRS measurement and accuracy requirements. In an embodiment, the PRS measurement and accuracy requirements may be a data structure 800 which includes one or more performance metrics 802 and corresponding cutoff thresholds 804 and number of stations 806. The data structure 800, or other equivalent information elements, may persist on the TRP 300, the LMF 120, or on another network server 400. The metrics and values may be associated with a positioning frequency layer, a base station, a PRS resource set, and/or a PRS resource. The PRS measurement and accuracy requirements may include a timer value indicating a time period and/or duration in which the UE is to apply requirements. In an example, another UE, such as the UE 105, may provide the PRS measurement and accuracy requirements to the UE 200 via a sidelink. The gNB 110a may be configured to transmit the metrics and values in LPP or RRC messaging. In an example, the PRS measurement and accuracy requirements may be included in one or more SIBs, or other lower level messaging (e.g., DCI, MAC CE).

At stage 1404, the method includes receiving one or more measurement values from the user equipment, wherein the one or more measurement values are based on the measurement and accuracy requirements. The TRP 300 and the LMF 120 are example a means for receiving the one or more PRS measurements from the UE. In example, a UE 105 may receive the one or more measurement values from the UE via a sidelink. One or more measurement values (e.g., RSRP, RSRQ, SNR, TOA accuracy, RSTD accuracy, RX and TX accuracy) associated with the PRS (or multiple PRS for RSTD) may be reported by the UE 200 to the network (e.g., gNB 110a, LMF 120). The UE 200 may utilize LPP/NPP, RRC or other messaging to report the PRS measurement results. In an example, the UE 200 may obtain PRS measurements from multiple base stations and limit the reporting to only the PRS ID which satisfy a PRS measurement and accuracy requirement. For example, referring to FIG. 10, the UE 200 may initially obtain PRS measurements on nine PRS transmissions and only report measurements for the first PRS 1002, the second PRS 1004, the third PRS 1006, and the fourth PRS 1008. In other examples, the UE 200 only measures PRS based on the PRS measurement and accuracy requirements and reports each of the measurements.

At stage 1406, the method includes determining a location of the user equipment based at least in part on the one or more measurement values. The TRP 300 and the LMF 120 are examples of means for determining a location of the UE. In an example, the UE 200 may be configured to determine a position based on the measurements and assistance data received from the network. One or more of many different techniques may be used to determine a position of the UE based on the received measurements. For example, known position-determination techniques based on RSRP, RSRQ, SNR, TOA accuracy, RSTD accuracy, RX and TX accuracy values may include one or more of RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine the location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine the location of the UE. In TDOA, the difference in arrival times at a receiving device of signals from different sources along with known locations of the sources and known offset of transmission times from the sources are used to determine the location of the receiving device.

Figure 15:
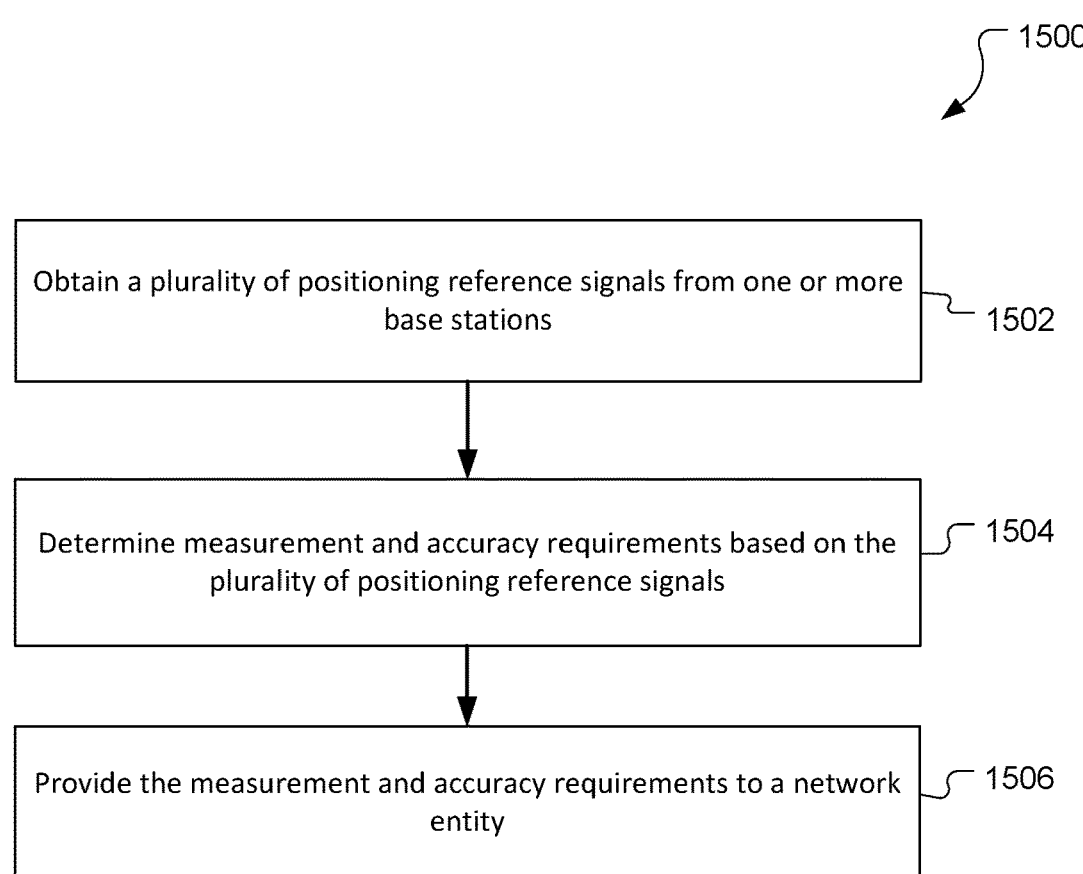
FIG. 15 is a process flow for an example method for determining measurement and accuracy requirements with a user equipment.

Referring to FIG. 15, with further reference to FIGS. 1-12, a method 1500 for determining measurement and accuracy requirement with a user equipment includes the stages shown. The method 1500 is, however, an example only and not limiting. The method 1500 may be altered, e.g., by having stages added, removed, rearranged, combined, performed concurrently, and/or having single stages split into multiple stages.

At stage 1502, the method includes obtaining a plurality of positioning reference signals from one or more base stations. The UE 200, including the general-purpose processor 230 and the transceiver 215, is a means for obtaining a plurality of PRSs. The UE 200 may obtain PRS signals at a location to generate PRS measurement and accuracy requirements. Referring to FIG. 10, for example, the UE 200 may be configured to obtain PRS signals from nine different TRPs, including the first PRS 1002, the second PRS 1004, the third PRS 1006, the fourth PRS 1008, the fifth PRS 1010, the sixth PRS 1012, the seventh PRS 1014, the eighth PRS 1016, and the ninth PRS 1018. The UE 200 may obtain measurement values such as the RSRP, RSRQ, SNR, TOA accuracy, RSTD accuracy, RX and TX accuracy values previously discussed for each of the nine PRSs. The UE 200 may obtain the measurement values at different times to develop a statistically relevant sample size of measurements to determine measurement and accuracy requirements.

At stage 1504, the method includes determining measurement and accuracy requirements based on the plurality of positioning reference signals. The UE 200, including the general-purpose processor 230 and the transceiver 215, is a means for determining the measurement and accuracy requirements. For example, the UE 200 may be configured to utilize local position accuracy models with defined thresholds for metrics such as PRS-RSRP, PRS-Pathloss, PRS-RSRQ, PRS-SNR, PRS-TOA accuracy, PRS-RSTD accuracy, and PRS-RX-TX accuracy. The local position accuracy models may be based on Kalman filtering, machine learning algorithms, deep learning, one or more neural networks, or other statistical processes to correlate a position accuracy with one or more of the metrics. The UE 200 may determine the cutoff threshold values and the number of base stations for the respective performance metrics.

At stage 1506, the method includes providing the measurement and accuracy requirements to a network entity. The UE 200, including the general-purpose processor 230 and the transceiver 215, is a means for providing the measurement and accuracy requirements. The measurement and accuracy requirement may be provided to a network entity such as the TRP 300, the LMF 120, or another network server 400. The measurement and accuracy requirements may be a data structure 800, or other electronic format such as one or more information elements in a messaging protocol (e.g., LPP, RRC, etc.). The UE 200 may be configured to provide the measurement and accuracy requirements via a sidelink to another UE (e.g., D2D, PSSCH), an RSU (e.g., PC5), or another network entity. The network entity may be configured to receive the measurement and accuracy requirement information from the UE 200 and provide it to other UEs in the network. In a crowdsourcing application, the LMF 120, or another network server 400, may be configured to receive measurement and accuracy requirement information from a plurality of UEs and disseminate measurements and accuracy requirement information to other UE's in the network.

Referring to FIG. 16, with further reference to FIGS. 1-12, a method 1600 for reporting positioning reference signal measurements includes the stages shown. The method 1600 is, however, an example only and not limiting. The method 1600 may be altered, e.g., by having stages added, removed, rearranged, combined, performed concurrently, and/or having single stages split into multiple stages.

At stage 1602, the method includes determining positioning reference signal measurement and accuracy requirements. The UE 200, including the general-purpose processor 230 and the transceiver 215, is a means for determining the PRS measurement and accuracy requirements. In an embodiment, the PRS measurement and accuracy requirements may be a data structure 800 including one or more performance metrics 802 and corresponding cutoff thresholds 804 and number of stations 806. The metrics and values may be associated with a positioning frequency layer, a base station, a PRS resource set, and/or a PRS resource. The PRS measurement and accuracy requirements may include a timer value indicating a time period and/or duration in which the requirements are to be applied. That is, the UE 200 may be configured to revert to a default operation upon the expiration of the timer value. In an example, a network entity such as the LMF 120, a gNB 110a, or a UE 105 may provide the PRS measurement and accuracy requirements to the UE 200. The gNB 110a may be configured to transmit the metrics and values in LPP/NPP or RRC messaging. In an example, the PRS measurement and accuracy requirements may be included in one or more SIBs. In an embodiment, lower level messaging such as DCI or MAC CE may be used. In an embodiment, the UE 105 may be configured to provide the PRS measurement and accuracy requirements to the UE 200 via a sidelink interface. For example, the UE 200 may receive the PRS measurement and accuracy requirements via one or more reports on a physical sidelink shared channel (PSSCH). A network station, such as a TRP 300, may provide sidelink configuration information to the UEs to enable the UEs to utilize sidelink communications.

At stage 1604, the method includes measuring a first set of positioning reference signals based on the positioning reference signal measurement and accuracy requirements. The UE 200, including the general-purpose processor 230 and the transceiver 215, is a means for measuring the PRS. In an example, the first set of PRS may include the PRS the UE 200 may detect on an initial scan. Referring to FIG. 10, for example, the first set of positioning reference signals may include PRS1 through PRS9. The UE 200 may be configured to obtain one or more measurement metrics such as RSRP, RSRQ, SNR, TOA accuracy, RSTD accuracy, RX and TX accuracy for each of the first set of PRS (e.g., PRS 1-9).

At stage 1606, the method includes determining one or more of a performance metric, a cutoff threshold for the performance metric, and a number of TRPs associated with the performance metric. The UE 200, including the general-purpose processor 230 and the transceiver 215, is a means for determining the PRS measurement and accuracy requirements. Continuing the example in FIG. 10, the UE 200 is configured to compare the performance metric measurements obtained for the first set of PRS (e.g., PRS 1-9) with the PRS measurement and accuracy requirements received at stage 1602. The PRS measurement and accuracy requirements indicates one or more metrics and associated cutoff threshold values. The cutoff threshold values may be based on raw measurement values, normalized values, or relative values to indicate the results of the measurement. The UE 200 may apply the PRS measurement and accuracy requirements to each of the measurements in the first set of PRSs. For example, the UE 200 may be configured to identify the PRS signals based on the first requirement 912, which includes 4 TRPs with RSRP signals above a measurement value of 8. The UE 200 will utilize the PRS within the first set of PRS which satisfy the measurement and accuracy requirements on subsequent positioning occasions. Thus, in this example, the UE 200 may measure, decode and report the first PRS 1002, the second PRS 1004, the third PRS 1006, and the fourth PRS 1008 in future positioning occasions.

At stage 1608, the method includes measuring a second set of positioning reference signals based on the one or more of the performance metric, the cutoff threshold, and the number of TRPs, wherein the second set of positioning reference signals is a subset of the first set of positioning reference signals. The UE 200, including the general-purpose processor 230 and the transceiver 215, is a means for measuring the second set of PRS. Continuing the example in FIG. 10, the UE 200 may measure and decode the first PRS 1002, the second PRS 1004, the third PRS 1006, and the fourth PRS 1008 as the second set of PRS. The first requirement 912 depicted in FIG. 10 is an example only and other performance metrics, cutoff thresholds for the performance metrics, and the number of TRPs associated with the performance metrics may be used to define the second set of PRS. The UE 200 may continue to measure only the first PRS 1002, the second PRS 1004, the third PRS 1006, and the fourth PRS 1008 until the measurement requirement is not satisfied (i.e., the RSRP of one PRS in the second set of PRS drops below 8). On subsequent positioning occasions, the UE 200 can complete a full scan and apply the PRS measurement and accuracy requirements to identify another subset of PRS which will satisfy one or more of the requirements.

At stage 1610, the method includes reporting one or more positioning reference signal measurement results based on the measuring of the second set of positioning reference signals. The UE 200, including the general-purpose processor 230 and the transceiver 215, is a means for reporting the one or more PRS measurements. One or more measurement values (e.g., RSRP, RSRQ, SNR, TOA accuracy, RSTD accuracy, RX-TX accuracy) associated with the PRS in the second set of PRS may be reported by the UE 200 to the network (e.g., gNB 110a, LMF 120). The UE 200 may utilize LPP/NPP, RRC or other messaging to report the PRS measurement results. Continuing the example of FIG. 10, the UE 200 may obtain an report PRS measurements for the first PRS 1002, the second PRS 1004, the third PRS 1006, and the fourth PRS 1008.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for measuring and reporting positioning reference signals, comprising:
   determining positioning reference signal measurement and accuracy requirements;
   measuring a first set of positioning reference signals based on the positioning reference signal measurement and accuracy requirements;
   determining one or more of a performance metric, a cutoff threshold for the performance metric, and a number of TRPs associated with the performance metric;
   measuring a second set of positioning reference signals based on the one or more of the performance metric, the cutoff threshold, and the number of TRPs, wherein the second set of positioning reference signals is a subset of the first set of positioning reference signals; and
   reporting one or more positioning reference signal measurement results based on the measuring of the second set of positioning reference signals.

2. The method of clause 1 wherein the cutoff threshold is a normalized measurement value based on the performance metric.

3. The method of clause 1 wherein the positioning reference signal measurement and accuracy requirements are received from a TRP or a network server.

4. The method of clause 3 wherein the positioning reference signal measurement and accuracy requirements are received via one or more of a positioning protocol message or a radio resource control message.

5. The method of clause 1 wherein the positioning reference signal measurement and accuracy requirements are received from a user equipment via a sidelink.

6. The method of clause 5 wherein the positioning reference signal measurement and accuracy requirements are included in one or more reports received on a physical sidelink shared channel (PSSCH).

7. The method of clause 5 further comprising receiving sidelink configuration information from one or more TRPs, wherein the positioning reference signal measurement and accuracy requirements are received from the user equipment via the sidelink based on the sidelink configuration information.

8. The method of clause 1 wherein the positioning reference signal measurement and accuracy requirements are associated with a positioning frequency layer.

9. The method of clause 1 wherein the positioning reference signal measurement and accuracy requirements are associated with a positioning reference signal resource set.

10. The method of clause 1 wherein the positioning reference signal measurement and accuracy requirements are associated with a positioning reference signal resource.

11. The method of clause 1 wherein the positioning reference signal measurement and accuracy requirements are associated with a TRP.

12. The method of clause 1 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

13. The method of clause 1 wherein the positioning reference signal measurement and accuracy requirements includes a time duration or an expiration time.

14. The method of clause 13 wherein the time duration or the expiration time are configured to instruct a user equipment to stop measuring one or more positioning reference signals in the first set of positioning reference signals for a period of time.

15. A method for determining a location of a user equipment, comprising:
   providing positioning reference signal measurement and accuracy requirements to the user equipment;
   receiving one or more measurement values from the user equipment, wherein the one or more measurement values are based on the positioning reference signal measurement and accuracy requirements; and
   determining the location of the user equipment based at least in part on the one or more measurement values.

16. The method of clause 15 wherein the positioning reference signal measurement and accuracy requirements include a performance metric and at a cutoff threshold and a number of base stations associated with the performance metric.

17. The method of clause 16 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

18. The method of clause 16 wherein the cutoff threshold is a normalized measurement value based on the performance metric.

19. The method of clause 15 wherein the positioning reference signal measurement and accuracy requirements are provided via one or more of a positioning protocol message or a radio resource control message.

20. The method of clause 15 wherein the positioning reference signal measurement and accuracy requirements includes a time duration or an expiration time.

21. The method of clause 20 wherein the time duration or the expiration time are configured to instruct the user equipment to stop measuring one or more positioning reference signals for a period of time.

22. A method for determining measurement and accuracy requirements, comprising:
   obtaining a plurality of positioning reference signals from one or more base stations;
   determining the measurement and accuracy requirements based on the plurality of positioning reference signals; and
   providing the measurement and accuracy requirements to a network entity.

23. The method of clause 22 wherein the measurement and accuracy requirements include a performance metric and at a cutoff threshold and a number of base stations associated with the performance metric.

24. The method of clause 23 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

25. The method of clause 23 wherein the cutoff threshold is a normalized measurement value based on the performance metric.

26. The method of clause 22 further comprising determining the measurement and accuracy requirements based on a Kalman filter and the plurality of positioning reference signals.

27. The method of clause 22 further comprising determining the measurement and accuracy requirements based on a machine learning algorithm and the plurality of positioning reference signals.

28. The method of clause 22 wherein providing the measurement and accuracy requirements includes providing the measurement and accuracy requirements to a base station.

29. The method of clause 22 wherein providing the measurement and accuracy requirements includes providing the measurement and accuracy requirements to a network server.

30. The method of clause 22 wherein providing the measurement and accuracy requirements includes providing the measurement and accuracy requirements to a user equipment via a sidelink.

31. The method of clause 30 wherein the positioning reference signal measurement and accuracy requirements are included in one or more reports provided on a physical sidelink shared channel (PSSCH).

32. The method of clause 30 further comprising receiving sidelink configuration information from one or more TRPs, wherein the positioning reference signal measurement and accuracy requirements are provided to the user equipment via the sidelink based on the sidelink configuration information.

33. A method for measuring and reporting positioning reference signals, comprising:

receiving positioning reference signal measurement and accuracy requirements;

measuring one or more positioning reference signals based on the positioning reference signal measurement and accuracy requirements; and reporting one or more positioning reference signal measurement results based on the measurement and accuracy requirements.

34. The method of clause 33 wherein the positioning reference signal measurement and accuracy requirements include a performance metric and at a cutoff threshold and a number of base stations associated with the performance metric.

35. The method of clause 34 wherein the cutoff threshold is a normalized measurement value based on the performance metric.

36. The method of clause 33 wherein the positioning reference signal measurement and accuracy requirements are received from a base station or a network server.

37. The method of clause 36 wherein the positioning reference signal measurement and accuracy requirements are received via one or more of a positioning protocol message or a radio resource control message.

38. The method of clause 33 wherein the positioning reference signal measurement and accuracy requirements are received from a user equipment via a sidelink.

39. The method of clause 33 wherein the positioning reference signal measurement and accuracy requirements are associated with a positioning frequency layer.

40. The method of clause 33 wherein the positioning reference signal measurement and accuracy requirements are associated with a positioning reference signal resource set.

41. The method of clause 33 wherein the positioning reference signal measurement and accuracy requirements are associated with a positioning reference signal resource element.

42. The method of clause 33 wherein the positioning reference signal measurement and accuracy requirements are associated with a base station.

43. The method of clause 33 wherein the positioning reference signal measurement and accuracy requirements include a time duration or expiration time.

44. An apparatus, comprising:

a memory;

at least one transceiver;

at least one processor communicatively coupled to the memory and the at least one transceiver and configured to:

determine positioning reference signal measurement and accuracy requirements;

measure a first set of positioning reference signals based on the positioning reference signal measurement and accuracy requirements;

determine one or more of a performance metric, a cutoff threshold for the performance metric, and a number of TRPs associated with the performance metric;

measure a second set of positioning reference signals based on the one or more of the performance metric, the cutoff threshold, and the number of TRPs, wherein the second set of positioning reference signals is a subset of the first set of positioning reference signals; and report one or more positioning reference signal measurement results based on the measuring of the second set of positioning reference signals.

45. The apparatus of clause 44 wherein the cutoff threshold is a normalized measurement value based on the performance metric.

46. The apparatus of clause 44 wherein the positioning reference signal measurement and accuracy requirements are received from a TRP or a network server.

47. The apparatus of clause 46 wherein the positioning reference signal measurement and accuracy requirements are received via one or more of a positioning protocol message or a radio resource control message.

48. The apparatus of clause 44 wherein the positioning reference signal measurement and accuracy requirements are received from a user equipment via a sidelink.

49. The apparatus of clause 48 wherein the positioning reference signal measurement and accuracy requirements are included in one or more reports received on a physical sidelink shared channel (PSSCH).

50. The apparatus of clause 48 further comprising receiving sidelink configuration information from one or more TRPs, wherein the positioning reference signal measurement and accuracy requirements are received from the user equipment via the sidelink based on the sidelink configuration information.

51. The apparatus of clause 44 wherein the positioning reference signal measurement and accuracy requirements are associated with a positioning frequency layer.

52. The apparatus of clause 44 wherein the positioning reference signal measurement and accuracy requirements are associated with a positioning reference signal resource set.

53. The apparatus of clause 44 wherein the positioning reference signal measurement and accuracy requirements are associated with a positioning reference signal resource.

54. The apparatus of clause 44 wherein the positioning reference signal measurement and accuracy requirements are associated with a TRP.

55. The apparatus of clause 44 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

56. The apparatus of clause 44 wherein the positioning reference signal measurement and accuracy requirements includes a time duration or an expiration time.

57. The apparatus of clause 56 wherein the time duration or the expiration time are configured to instruct a user equipment to stop measuring one or more positioning reference signals in the first set of positioning reference signals for a period of time.

58. An apparatus, comprising:
a memory;
at least one transceiver;
at least one processor communicatively coupled to the memory and the at least one transceiver and configured to:
provide positioning reference signal measurement and accuracy requirements to a user equipment;
receive one or more measurement values from the user equipment, wherein the one or more measurement values are based on the positioning reference signal measurement and accuracy requirements; and
determine a location of the user equipment based at least in part on the one or more measurement values.

59. The apparatus of clause 58 wherein the positioning reference signal measurement and accuracy requirements include a performance metric and at a cutoff threshold and a number of base stations associated with the performance metric.

60. The apparatus of clause 59 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

61. The apparatus of clause 59 wherein the cutoff threshold is a normalized measurement value based on the performance metric.

62. The apparatus of clause 58 wherein the positioning reference signal measurement and accuracy requirements are provided via one or more of a positioning protocol message or a radio resource control message.

63. The apparatus of clause 58 wherein the positioning reference signal measurement and accuracy requirements includes a time duration or an expiration time.

64. The apparatus of clause 63 wherein the time duration or the expiration time are configured to instruct the user equipment to stop measuring one or more positioning reference signals for a period of time.

65. An apparatus, comprising:
a memory;
at least one transceiver;

at least one processor communicatively coupled to the memory and the at least one transceiver and configured to:
obtain a plurality of positioning reference signals from one or more base stations;
determine the measurement and accuracy requirements based on the plurality of positioning reference signals; and
provide the measurement and accuracy requirements to a network entity.

66. The apparatus of clause 65 wherein the measurement and accuracy requirements include a performance metric and at a cutoff threshold and a number of base stations associated with the performance metric.

67. The apparatus of clause 66 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

68. The apparatus of clause 66 wherein the cutoff threshold is a normalized measurement value based on the performance metric.

69. The apparatus of clause 65 wherein the at least one processor is further configured to determine the measurement and accuracy requirements based on a Kalman filter and the plurality of positioning reference signals.

70. The apparatus of clause 65 wherein the at least one processor is further configured to determine the measurement and accuracy requirements based on a machine learning algorithm and the plurality of positioning reference signals.

71. The apparatus of clause 65 wherein the at least one processor is further configured to provide the measurement and accuracy requirements to a base station.

72. The apparatus of clause 65 wherein the at least one processor is further configured to provide the measurement and accuracy requirements to a network server.

73. The apparatus of clause 65 wherein the at least one processor is further configured to provide the measurement and accuracy requirements to a user equipment via a sidelink.

74. The apparatus of clause 73 wherein the positioning reference signal measurement and accuracy requirements are included in one or more reports provided on a physical sidelink shared channel (PSSCH).

75. The apparatus of clause 73 wherein the at least one processor is further configured to receive sidelink configuration information from one or more TRPs, wherein the positioning reference signal measurement and accuracy requirements are provided to the user equipment via the sidelink based on the sidelink configuration information.

76. An apparatus for measuring and reporting positioning reference signals, comprising:
means for determining positioning reference signal measurement and accuracy requirements;
means for measuring a first set of positioning reference signals based on the positioning reference signal measurement and accuracy requirements;
means for determining one or more of a performance metric, a cutoff threshold for the performance metric, and a number of TRPs associated with the performance metric;
means for measuring a second set of positioning reference signals based on the one or more of the performance metric, the cutoff threshold, and the number of TRPs, wherein the second set of positioning reference signals is a subset of the first set of positioning reference signals; and means for reporting one or more positioning reference signal measurement results based on the measuring of the second set of positioning reference signals.

77. An apparatus for determining a location of a user equipment, comprising:

means for providing positioning reference signal measurement and accuracy requirements to the user equipment;

means for receiving one or more measurement values from the user equipment, wherein the one or more measurement values are based on the positioning reference signal measurement and accuracy requirements; and means for determining the location of the user equipment based at least in part on the one or more measurement values.

78. An apparatus for determining measurement and accuracy requirements, comprising:

means for obtaining a plurality of positioning reference signals from one or more base stations;

means for determining the measurement and accuracy requirements based on the plurality of positioning reference signals; and means for providing the measurement and accuracy requirements to a network entity.

79. A method for measuring and reporting positioning reference signals, comprising:

means for receiving positioning reference signal measurement and accuracy requirements;

means for measuring one or more positioning reference signals based on the positioning reference signal measurement and accuracy requirements; and means for reporting one or more positioning reference signal measurement results based on the measurement and accuracy requirements.

80. A non-transitory processor-readable storage medium comprising processor-readable instructions configured to cause one or more processors to measure and report positioning reference signals, comprising:

code for determining positioning reference signal measurement and accuracy requirements;

code for measuring a first set of positioning reference signals based on the positioning reference signal measurement and accuracy requirements;

code for determining one or more of a performance metric, a cutoff threshold for the performance metric, and a number of TRPs associated with the performance metric;

code for measuring a second set of positioning reference signals based on the one or more of the performance metric, the cutoff threshold, and the number of TRPs, wherein the second set of positioning reference signals is a subset of the first set of positioning reference signals; and code for reporting one or more positioning reference signal measurement results based on the measuring of the second set of positioning reference signals.

81. A non-transitory processor-readable storage medium comprising processor-readable instructions configured to cause one or more processors to determine a location of a user equipment, comprising:

code for providing positioning reference signal measurement and accuracy requirements to the user equipment;

code for receiving one or more measurement values from the user equipment, wherein the one or more measurement values are based on the positioning reference signal measurement and accuracy requirements; and code for determining the location of the user equipment based at least in part on the one or more measurement values.

82. A non-transitory processor-readable storage medium comprising processor-readable instructions configured to cause one or more processors to determine measurement and accuracy requirements, comprising:

code for obtaining a plurality of positioning reference signals from one or more base stations;

code for determining the measurement and accuracy requirements based on the plurality of positioning reference signals; and code for providing the measurement and accuracy requirements to a network entity.

83. A non-transitory processor-readable storage medium comprising processor-readable instructions configured to cause one or more processors to measure and report positioning reference signals, comprising:

code for receiving positioning reference signal measurement and accuracy requirements;

code for measuring one or more positioning reference signals based on the positioning reference signal measurement and accuracy requirements; and code for reporting one or more positioning reference signal measurement results based on the measurement and accuracy requirements.

The invention claimed is:

1. A method for measuring and reporting positioning reference signals, comprising:

determining positioning reference signal measurement and accuracy requirements;

measuring a first set of positioning reference signals based on the positioning reference signal measurement and accuracy requirements;

determining a performance metric, a cutoff threshold for the performance metric, and a number of TRPs associated with the performance metric and the cutoff threshold for the performance metric;

measuring a second set of positioning reference signals based on the performance metric, the cutoff threshold, and the number of TRPs, wherein the second set of positioning reference signals is a subset of the first set of positioning reference signals consisting of a quantity of positioning reference signals equal to the number of TRPs associated with the performance metric and the cutoff threshold, wherein measuring the second set of positioning reference signals is based on a measurement of the performance metric for each positioning reference signal in the subset of the first set of positioning reference signals meeting the cutoff threshold; and reporting one or more positioning reference signal measurement results based on the measuring of the second set of positioning reference signals.

2. The method of claim 1 wherein the cutoff threshold is a normalized measurement value based on the performance metric.

3. The method of claim 1 wherein the positioning reference signal measurement and accuracy requirements are received from a TRP or a network server.

4. The method of claim 3 wherein the positioning reference signal measurement and accuracy requirements are received via one or more of a positioning protocol message or a radio resource control message.

5. The method of claim 1 wherein the positioning reference signal measurement and accuracy requirements are received from a user equipment via a sidelink.

6. The method of claim 5 wherein the positioning reference signal measurement and accuracy requirements are included in one or more reports received on a physical sidelink shared channel (PSSCH).

7. The method of claim 5 further comprising receiving sidelink configuration information from one or more TRPs, wherein the positioning reference signal measurement and accuracy requirements are received from the user equipment via the sidelink based on the sidelink configuration information.

8. The method of claim 1 wherein the positioning reference signal measurement and accuracy requirements are associated with a positioning frequency layer.

9. The method of claim 1 wherein the positioning reference signal measurement and accuracy requirements are associated with a positioning reference signal resource set.

10. The method of claim 1 wherein the positioning reference signal measurement and accuracy requirements are associated with a positioning reference signal resource.

11. The method of claim 1 wherein the positioning reference signal measurement and accuracy requirements are associated with a TRP.

12. The method of claim 1 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

13. The method of claim 1 wherein the positioning reference signal measurement and accuracy requirements includes a time duration or an expiration time.

14. The method of claim 13 wherein the time duration or the expiration time are configured to instruct a user equipment to stop measuring one or more positioning reference signals in the first set of positioning reference signals for a period of time.

15. A method for measuring and reporting positioning reference signals, comprising:

receiving positioning reference signal measurement and accuracy requirements;

measuring only enough positioning reference signals to satisfy the positioning reference signal measurement and accuracy requirements; and reporting one or more positioning reference signal measurement results of the positioning reference signals measured to satisfy the positioning reference signal measurement and accuracy requirements.

16. The method of claim 15 wherein the positioning reference signal measurement and accuracy requirements include a performance metric and at a cutoff threshold and a number of base stations associated with the performance metric.

17. The method of claim 16 wherein the cutoff threshold is a normalized measurement value based on the performance metric.

18. The method of claim 15 wherein the positioning reference signal measurement and accuracy requirements are received from a base station or a network server.

19. The method of claim 18 wherein the positioning reference signal measurement and accuracy requirements are received via one or more of a positioning protocol message or a radio resource control message.

20. The method of claim 15 wherein the positioning reference signal measurement and accuracy requirements are received from a user equipment via a sidelink.

21. The method of claim 15 wherein the positioning reference signal measurement and accuracy requirements are associated with a positioning frequency layer.

22. The method of claim 15 wherein the positioning reference signal measurement and accuracy requirements are associated with a positioning reference signal resource set.

23. The method of claim 15 wherein the positioning reference signal measurement and accuracy requirements are associated with a positioning reference signal resource element.

24. The method of claim 15 wherein the positioning reference signal measurement and accuracy requirements are associated with a base station.

25. The method of claim 15 wherein the positioning reference signal measurement and accuracy requirements include a time duration or expiration time.

26. An apparatus, comprising:

a memory;

at least one transceiver;

at least one processor communicatively coupled to the memory and the at least one transceiver and configured to:

determine positioning reference signal measurement and accuracy requirements;

measure a first set of positioning reference signals based on the positioning reference signal measurement and accuracy requirements;

determine a performance metric, a cutoff threshold for the performance metric, and a number of TRPs associated with the performance metric and the cutoff threshold for the performance metric;

measure a second set of positioning reference signals based on the the performance metric, the cutoff threshold, and the number of TRPs, wherein the second set of positioning reference signals is a subset of the first set of positioning reference signals consisting of a quantity of positioning reference signals equal to the number of TRPs associated with the performance metric and the cutoff threshold, wherein the at least one processor is configured to measure the second set of positioning reference signals based on a measurement of the performance metric for each positioning reference signal in the subset of the first set of positioning reference signals meeting the cutoff threshold; and report one or more positioning reference signal measurement results based on the measuring of the second set of positioning reference signals.

27. The apparatus of claim 26 wherein the performance metric includes one of a reference signal received power (RSRP) value, a pathloss estimate, a reference signal received quality (RSRQ) value, a signal to noise ratio (SNR) value, a signal to noise and interference ratio (SINR) value, a time of arrival (TOA) value, a reference signal time difference (RSTD) value, a quality metric, and a receive-transmit (RX-TX) accuracy.

28. The apparatus of claim 26 wherein the positioning reference signal measurement and accuracy requirements includes a time duration or an expiration time.

29. The apparatus of claim 28 wherein the time duration or the expiration time are configured to instruct a user equipment to stop measuring one or more positioning reference signals in the first set of positioning reference signals for a period of time.

30. An apparatus, comprising:

a memory;

at least one transceiver;

at least one processor communicatively coupled to the memory and the at least one transceiver, and configured to:

receive positioning reference signal measurement and accuracy requirements;

measure only enough positioning reference signals to satisfy the positioning reference signal measurement and accuracy requirements; and report one or more positioning reference signal measurement results based on of the positioning reference signals measured to satisfy the positioning reference signal measurement and accuracy requirements.

* * * * *